(12) United States Patent  
Giustino

(10) Patent No.: US 6,550,320 B1  
(45) Date of Patent: Apr. 22, 2003

(54) SYSTEM AND METHOD FOR PREDICTING TIRE FORCES USING TIRE DEFORMATION SENSORS

(75) Inventor: James M. Giustino, Waxhaw, NC (US)

(73) Assignee: Continental AG (DE)

( * ) Notice: Subject to any disclaimer, the term of this patent is extended or adjusted under 35 U.S.C. 154(b) by 0 days.

(21) Appl. No.: 09/584,230

(22) Filed: May 31, 2000

(51) Int. Cl.[7] .......................... E01C 23/00; G01M 17/02
(52) U.S. Cl. ........................................ 73/146
(58) Field of Search ............................. 73/146, 9, 755; 706/14; 324/166; 701/1, 29; 340/442–448

(56) References Cited

U.S. PATENT DOCUMENTS

| | | |
|---|---|---|
| 5,586,028 A | 12/1996 | Sekine et al. |
| 5,734,319 A | 3/1998 | Stephens et al. |
| 5,781,700 A | 7/1998 | Puskorius et al. |
| 5,864,056 A * | 1/1999 | Bell et al. ...................... 73/146 |
| 5,895,435 A | 4/1999 | Ohta et al. |
| 5,895,854 A * | 4/1999 | Becherer et al. .......... 73/514.39 |
| 5,904,215 A | 5/1999 | Ikeda |
| 5,913,240 A | 6/1999 | Drahne et al. |
| 5,926,017 A | 7/1999 | Von Grünberg et al. |

FOREIGN PATENT DOCUMENTS

| | | |
|---|---|---|
| EP | 833 162 A2 | 4/1998 |
| EP | 833 162 A3 | 4/1999 |

OTHER PUBLICATIONS

"Neural network representation of tyre characteristics: the Neuro–Tyre" by Palkovics, et al., *Int. J. O fVehicle Design*, vol. 14, No. 5/6, 1993, pp. 563–591.
International Search Report received from the International Searching Authority dated Jan. 16, 2002.
Continental/Chrysler Presentation, Jan. 20, 1999.
*Neural Networks for Statistical Modeling* by Murray Smith, ©1993, Van Norstrand Reinhold, New York, New York, pp. 32–35.
"Tires as Sensors" by Pasterkamp, *Tire Technology International*, Jun. 1999, pp. 33–35.
"Neural Network FAQ, part 1 of 7: Introduction", ftp://ftp.sas.com/pub/neural/FAQ.html, Aug. 2, 1999.
"Neural Network FAQ, part 2 of 7: Learning", ftp://ftp.sas.com/pub/neural/FAQ2.html, Aug. 2, 1999.
"Neural Network FAQ, part 3 of 7: Generalization", ftp://ftp.sas.com/pub/neural/FAQ3.html, Aug. 2, 1999.
"Neural Network FAQ, part 4 of 7: Books, data, etc.", ftp://ftp.sas.com/pub/neural/FAQ4.html, Aug. 2, 1999.
"Neural Network FAQ, part 5 of 7: Free Software", ftp://ftp.sas.com/pub/neural/FAQ5.html, Aug. 2, 1999.
"Neural Network FAQ, part 6 of 7: Commercial Software", ftp://ftp.sas.com/pub/neural/FAQ6.html, Aug. 2, 1999.
Neural Network FAQ, part 7 of 7: Hardware and Miscellaneous, ftp://ftp.sas.com/pub/neural/FAQ7.htm Aug. 2, 1999.
Press Release: "Continental General Tire Touts "Intelligent Tire" Sidewall Torsion Sensor System (SWT) Help Redefine the Role of the Tire", Charlotte, NC, Feb. 25, 1999.
Press Release: Revolutionary Continental Technology, The "Intelligent Tyre", Hanover, Oct. 1998.

* cited by examiner

*Primary Examiner*—Benjamin R. Fuller
*Assistant Examiner*—Marissa Ferguson
(74) *Attorney, Agent, or Firm*—Calfee, Halter & Griswold LLP

(57) ABSTRACT

A system and method for predicting the forces generated in the tire contact patch from measurements of tire deformations, including separating the lateral force, the vertical force, and the circumferential torque using measurements of tire deformations. A system and method for using a trained neural network or bilinear equations to determine any combination or permutation of one or more of any of the following from tire sidewall deformation sensors, e.g., magnetic tire sidewall torsion measuring (SWT) sensors: the lateral force acting on the tire, the circumferential torque acting on the tire, the longitudinal force acting on the tire, the vertical force acting on the tire, and forces and/or torques having any one or more of the foregoing as components thereof.

45 Claims, 24 Drawing Sheets

SYSTEM AND METHOD FOR PREDICTING TIRE FORCES USING TIRE DEFORMATION SENSORS

CROSS-REFERENCE TO RELATED APPLICATIONS

This application is believed to be related to the following issued patents and pending applications: U.S. Pat. Nos. 5,895,854; 5,913,240; 5,926,017; 5,964,265; 6,161,431; and 6,308,758; and U.S. patent application Ser. No. 09/347,757 filed Apr. 11, 2002 and entitled TIRE STATUS DETECTION SYSTEM AND METHOD.

FIELD OF THE INVENTION

The present invention relates generally to the field of tire dynamics and more specifically to predicting the forces generated in the tire contact patch from measurements of tire deformations, including separating the lateral force and the circumferential torque using measurements of tire deformations.

BACKGROUND OF THE INVENTION

U.S. Pat. No. 5,895,854, which is incorporated herein by reference, discloses a vehicle wheel that is provided with a pneumatic (rubber) tire having at least at one predetermined location a rubber mixture that is permeated with magnetizable particles that have been magnetized. As stated in that patent, the tire disclosed therein can be used in a slip regulation system. Preferably, the magnetized locations are located in one or more annular bands in the sidewall of the tire, i.e., in the longitudinal or peripheral direction, and have successive zones of different magnetization in one or more rows disposed at different radii along the peripheral direction of the tire. It was an object of that patent to provide a vehicle wheel having a pneumatic (rubber) tire, with the aid of which the information required for operating a modem vehicle, e.g. wheel rotational speed for ABS (Anti-lock Brake system) and/or longitudinal forces (torsional forces) that act upon the tire for regulating slipping, can be made available.

According to that patent, the generated magnetization and the spatial magnetization differences could be detected with magnetic field sensors and can serve as SWT sensor input signals (sidewall torsion sensor input signals) for slip regulating systems, especially also for SWT systems (sidewall torsion measuring systems). As further stated in that patent, it was previously thought that in order to be able to detect a change of the time span between the passes of the two marks (in one row for ABS or in two rows for SWT) as precisely as possible, it was desired that the magnetization in the peripheral direction be effected as quadrilaterally as possible, i.e. that the magnetization should be substantially homogeneous within a cohesive region (code bars), and above all at the boundaries of this region should change with as great a gradient as possible. In contrast, it was stated that for the conventional ABS systems that detected the wheel rotations, it was sufficient if the magnetization in the peripheral direction of the tire be effected in a sinusoidal manner.

Thus, a primary function of the SWT system using the SWT sensor has always been to measure the torsional deformation in the tangential direction of the tire and use that torsional deformation to calculate the applied driving or braking torque. However, cornering maneuvers adversely affect the calculation of driving torque or braking torque, because the presence of lateral forces on the tire confounds the measurement of longitudinal torque using the SWT sensor as originally envisioned (using phase differences between the two sensors detecting the magnetic bands in the tire sidewall to calculate torsional deformation). Additionally, the presence of a vertical force on the tire further confounds the measurement of longitudinal torque using the SWT sensor as originally envisioned, although not as severely as lateral force does.

SUMMARY OF THE INVENTION

The present invention provides a system and method for not only decoupling the lateral and tangential forces to allow the SWT sensor to be used to effectively measure longitudinal torque, but also predicting the lateral force and other forces and torques acting on the tire using the SWT sensors.

According to the present invention, a system and method are provided for predicting the forces generated in the tire contact patch from measurements of tire deformations, including separating skewed forces, e.g., lateral force and circumferential torque, using measurements of tire deformations.

According to one aspect of the system of the present invention, a trained processor, e.g., a trained neural network, is used to predict skewed forces, e.g., lateral force and circumferential torque, using measurements of tire deformations. In a first embodiment, a trained neural network is used to predict at least one force acting on the tire, preferably lateral force and circumferential torque. In a second embodiment, a set of bilinear equations are used to predict at least one force acting on the tire, preferably lateral force and circumferential torque.

It is therefore an advantage of the present invention to provide a system and method for determining circumferential torque using tire deformation sensors, e.g., SWT sensors.

It is also an advantage of the present invention to provide a system and method for determining lateral force using tire deformation sensors, e.g., SWT sensors.

It is therefore another advantage of the present invention to provide a system and method for decoupling lateral force and circumferential torque in measurements from tire deformation sensors, e.g., SWT sensors.

It is a further advantage of this invention to provide a system and method for determining vehicle yaw rate from tire deformation sensors, e.g., SWT sensors, thereby eliminating the need for a separate yaw rate sensor.

It is yet another advantage of the present invention to provide a system and method for determining vehicle speed from tire deformation sensors, e.g., SWT sensors, thereby eliminating the need for a separate speed sensor.

It is still another advantage of the present invention to provide a system and method for using a trained neural network to determine any combination or permutation of one or more of any of the following from tire deformation sensors, e.g., SWT sensors: the lateral force acting on the tire, the circumferential torque acting on the tire, the longitudinal force acting on the tire, the vertical force acting on the tire, and forces and/or torques having any one or more of the foregoing as components thereof.

It is further still another advantage of the present invention to provide a system and method for using bilinear equations to determine any combination or permutation of one or more of any of the following from tire deformation sensors, e.g., SWT sensors: the lateral force acting on the tire, the circumferential torque acting on the tire, the longitudinal force acting on the tire, the vertical force acting on the tire, and forces and/or torques having any one or more of the foregoing as components thereof.

It is another advantage of the present invention to decouple circumferential torque of a tire from lateral forces and vertical forces acting on the tire.

It is still another advantage of the present invention to provide a system and method for determining any combination or permutation of one or more of any of the following from tire sidewall deformation sensors, e.g., SWT sensors: the lateral force acting on the tire, the circumferential torque acting on the tire, the longitudinal force acting on the tire, the vertical force acting on the tire, and forces and/or torques having any one or more of the foregoing as components thereof.

These and other advantages of the present invention will become more apparent from a detailed description of the invention.

BRIEF DESCRIPTION OF THE DRAWINGS

The file of this patent contains at least one drawing executed in color. Copies of this patent with color drawing will be provided by the Patent and Trademark Office upon request and payment of the necessary fee.

In the accompanying drawings, which are incorporated in and constitute a part of this specification, embodiments of the invention are illustrated, which, together with a general description of the invention given above, and the detailed description given below serve to example the principles of this invention.

DETAILED DESCRIPTION OF THE PREFERRED EMBODIMENT

"Circuit communication" as used herein is used to indicate a communicative relationship between devices. Direct electrical and optical connections and indirect electrical and optical connections are examples of circuit communication. Two devices are in circuit communication if a signal from one is received by the other, regardless of whether the signal is modified by some other device. For example, two devices separated by one or more of the following—transformers, optoisolators, digital or analog buffers, analog integrators, other electronic circuitry, fiber optic transceivers, or even satellites—are in circuit communication if a signal from one reaches the other, even though the signal is modified by the intermediate device(s). As a final example, two devices not directly connected to each other, but both capable of interfacing with a third device, e.g., a CPU, are in circuit communication. As used herein, "input" refers to either a signal or a value and "output" refers to either a signal or a value.

Figure 1:
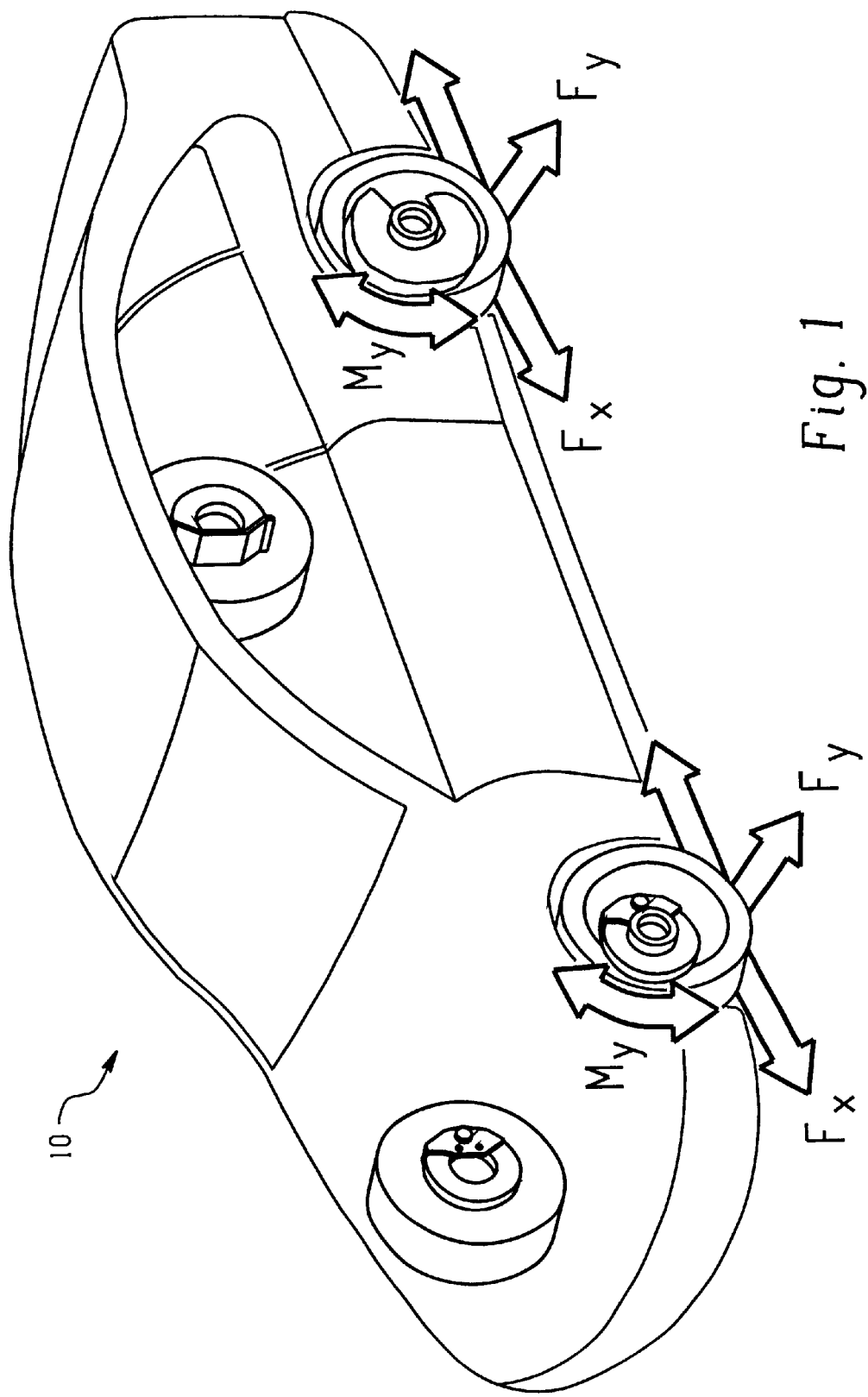
FIG. 1 is a perspective view of a vehicle showing various forces and torques.

Referring now to FIG. 1, the forces referred to herein are shown schematically. In that figure, a vehicle 10 is shown schematically along with the longitudinal force $F_x$, the longitudinal (circumferential) torque $M_y$, and the lateral force $F_y$ acting on the tires. Although not shown in FIG. 1, another force of interest is the vertical force $F_z$ which is perpendicular to the longitudinal force $F_x$ and the lateral force $F_y$.

Figure 2:
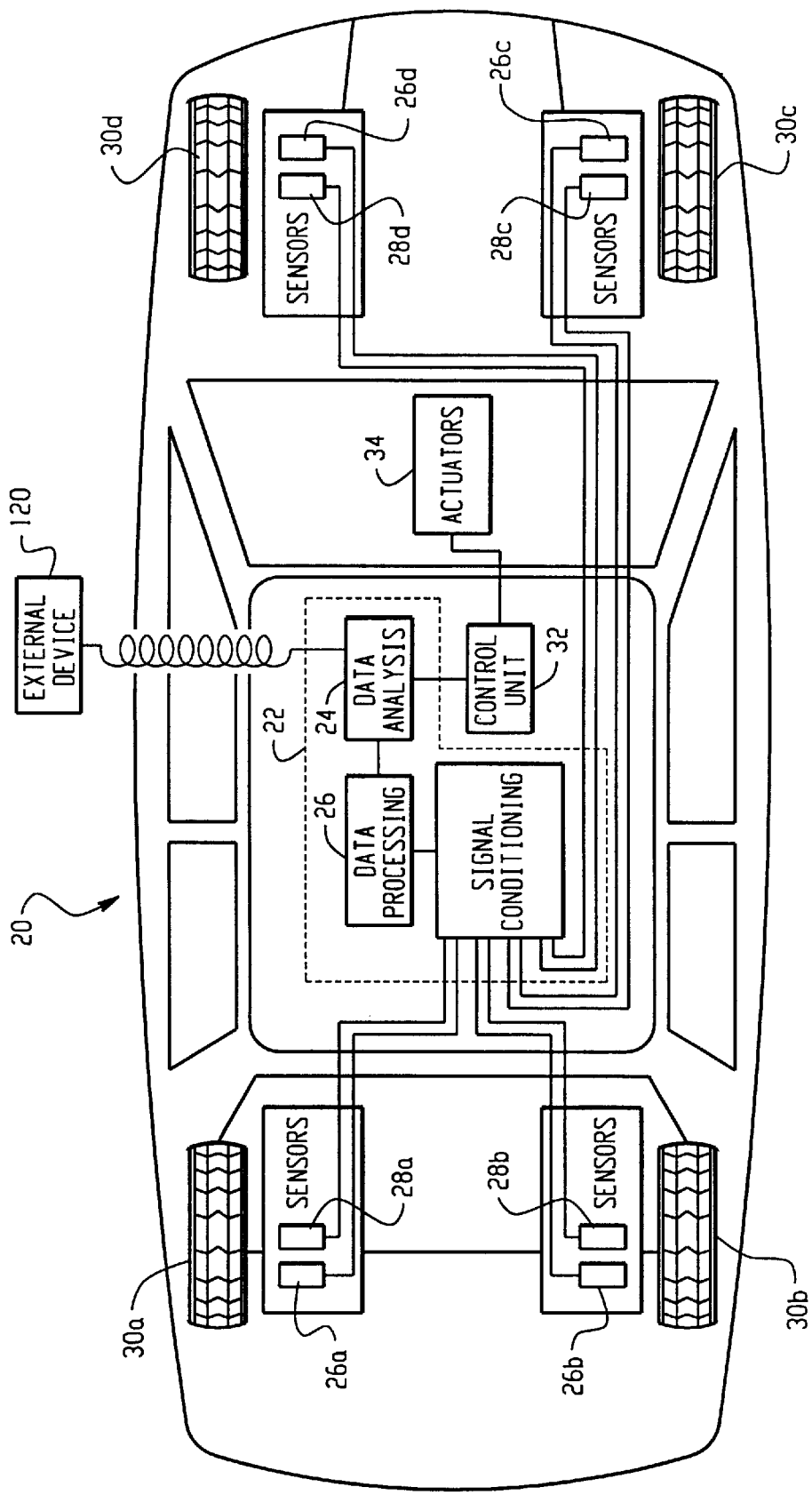
FIG. 2 is a schematic block diagram of a system of the present invention.

Referring now to FIG. 2, a vehicle control system 20 according to the present invention is shown schematically. In the broadest sense, the vehicle control system 20 comprises a force prediction unit 22 to be placed in circuit communication with at least one tire sidewall deformation sensor. Preferably, the tire sidewall deformation sensor is a magnetic tire sidewall torsion (SWT) sensor. The force prediction unit 22 has a preprogrammed processor (not shown) that receives input from the at least one SWT sensor and at least one other sensor input and performs data analysis by implementing preprogrammed equations having constants determined from previously collected data to determine from at least the SWT input and the at least one other sensor input an output corresponding to a predicted circumferential torque and/or longitudinal force and/or lateral force and/or vertical force acting on the tire. The force prediction unit 22 may also perform any necessary signal conditioning and data processing associated with the SWT sensor and the other sensor.

With respect to FIG. 2, in a preferred embodiment, the force prediction unit 22 is placed in circuit communication with a pair of magnetic SWT sensors 26, 28 for each tire 30 of the vehicle 20; however, the force prediction unit 22 may be used with as little as one SWT sensor 26 on a single tire 30 and another sensor, e.g., another SWT sensor 28 or an ABS speed sensor (not shown) to provide force predictions about that one tire 30. Preferably, the force prediction unit 22 is placed in circuit communication with a control unit 32, which is in circuit communication with and affects the dynamic state of the vehicle 20 via one or more actuators 34. Examples of control units 32 and actuators 34 known to those in the art include combinations and permutations of one or more of the following: an ABS control unit with braking actuators, a traction control system (TCS) control unit with braking and throttle actuators, an electronic stability control (ESC) (also known as an integrated vehicle dynamics (IVD)) control unit with braking and throttle actuators, a locked differential control unit, a suspension control unit, a brake assist control unit with braking actuators, an intelligent cruise control unit with vehicle throttle actuators, a steering assist control unit with steering actuators, a deflation detection control unit, a navigation control unit, a rollover prevention control unit, and a brake-by-wire control unit with braking actuators. Significantly, these exemplary control units 32 and actuators 34 require one of more of the following sensors—a longitudinal accelerometer (for longitudinal force and/or acceleration), a lateral accelerometer (for lateral force and/or acceleration), a vertical load sensor, wheel speed sensors, and a yaw rate sensor, all of which can be replaced by one or more SWT sensors coupled with the teachings of the present invention.

The force prediction unit 22 can be implemented with various combinations of analog and digital circuitry, processors, and the like. The control unit can be implemented with separate circuitry and/or processor(s) or with circuitry and/or processor(s) used to implement the force prediction unit 22. Preferably, the data processing and data analysis portions of the force prediction unit 22 are implemented in a single processor, with the signal conditioning being performed in dedicated analog circuitry (not shown).

Figure 3:
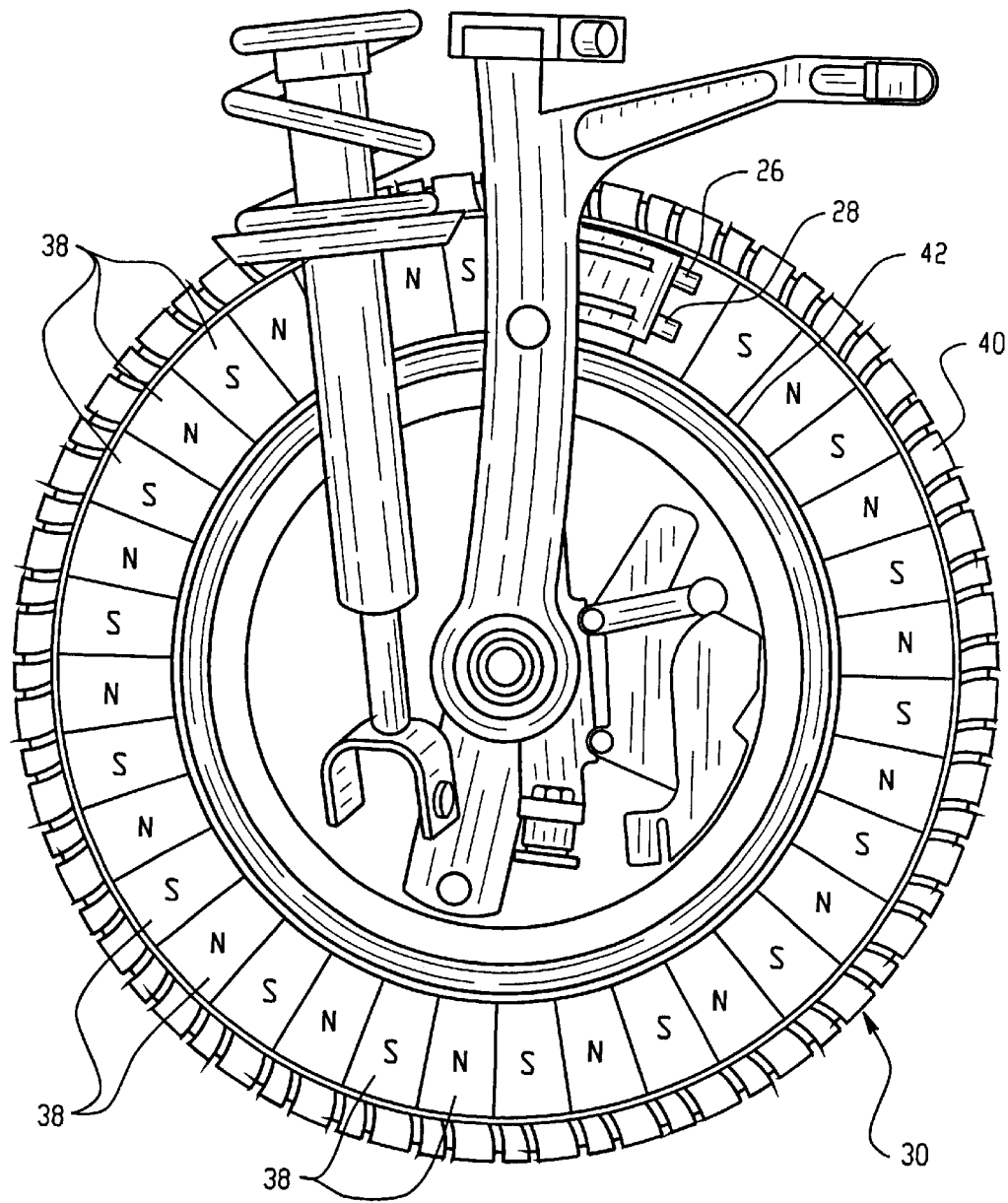
FIG. 3 is a side view of a tire having magnetic bands of alternating polarity and corresponding sensors used with the system and method of the present invention.

Referring now to FIG. 3, a pair of SWT sensors 26, 28 is shown schematically with the corresponding magnetic tire 30. As shown schematically in FIG. 3, the magnetic tire 30 used with the SWT sensors 26, 28 preferably has a number of alternating bands 38 of magnetic polarity. The magnetic tires can be made in any number of ways, e.g., as taught in U.S. Pat. No. 5,895,854, as taught in U.S. patent application Ser. No. 09/347,757, now U.S. Pat. No. 6,308,758, which is incorporated herein by reference, or in any number of other ways, e.g., providing alternating bands of premagnetized thin material, embedding adjacent alternating magnetic bands into the sidewall of a green tire, and curing the green tire. The SWT sensors 26, 28 themselves are preferably magnetic sensors, e.g., magneto-resistive (MR) sensors, Hall effect sensors, or flux gate sensors, positioned close enough to the magnetic regions of the sidewall of tire to interact therewith. MR sensors have the advantages of allowing a moderate air gap and have been extensively tested. Flux gate sensors have the advantage of allowing an air gap of between one to two inches. Hall effect sensors have the disadvantage of requiring a relatively small air gap. If two SWT sensors are used, one sensor 26 is preferably positioned near the tread 40 and the other sensor 28 is preferably positioned near the bead 42. If only one SWT sensor is used with another sensor, e.g., an ABS speed sensor, the SWT sensor 26 is preferably positioned closer to the tread 40 than the bead 42 to provide greater sensitivity to torsional deformation.

Figure 4:
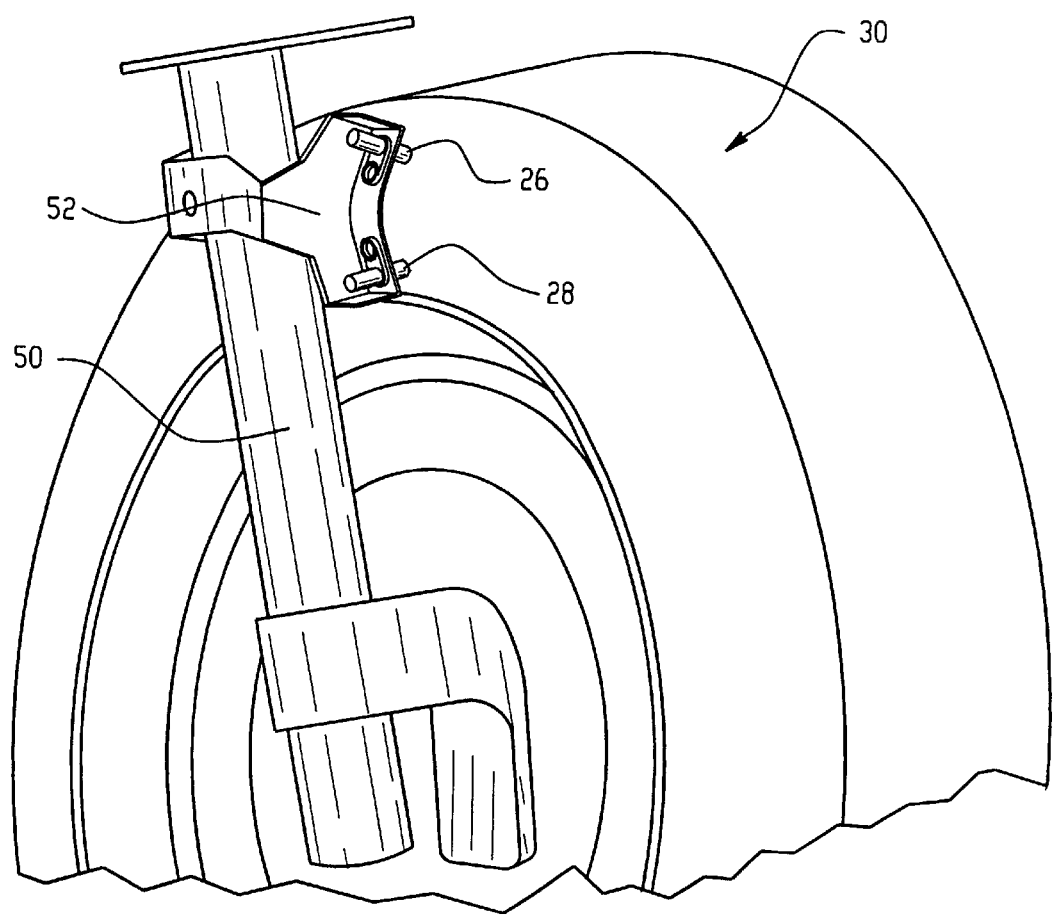
FIG. 4 is a perspective view of a mounting bracket fixed to a suspension strut and holding two magnetic sensors in close proximity to the magnetic sidewall of the tire.
Figure 5:
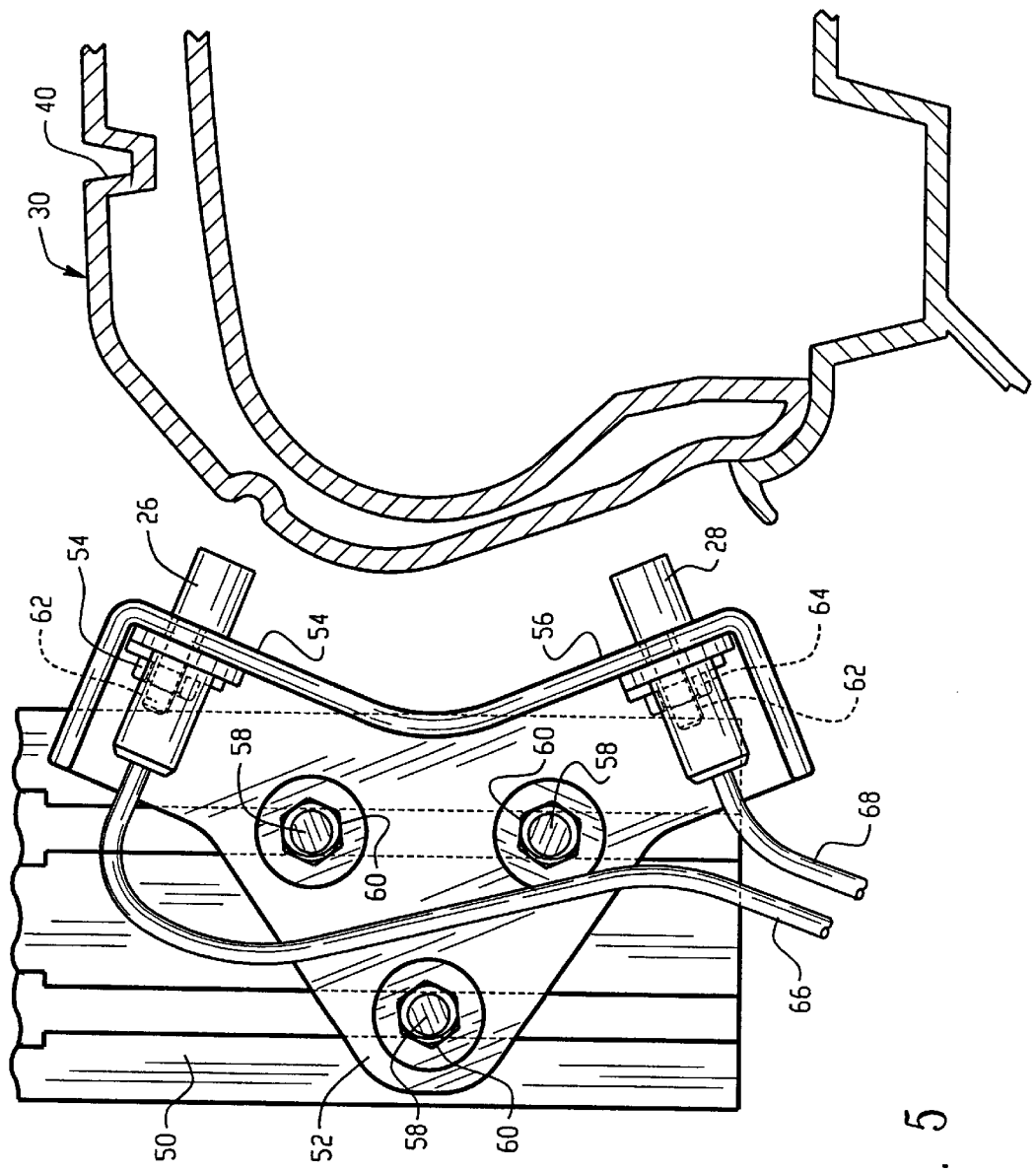
FIG. 5 is a close up view of the mounting bracket and sensors shown in FIG. 5.

Referring now to FIG. 4 and FIG. 5, the mounting of the sensors 26, 28 to a vehicle suspension strut 50 is shown. Preferably the sensors 26, 28 are mounted to a suspension strut 50 via a mounting bracket 52. In FIG. 4 and FIG. 5, the sensors 26, 28 are model number KMZ10A magneto-resistive (MR) sensors, available from Philips. Mounting bracket 52 preferably is configured so that the flat end portion of hall effect sensors 26, 28 are substantially parallel to the sidewall of magnetic tire 30. Preferably, the flat end portion of MR sensors 26, 28 are 12.5 mm from the surface of the sidewall of magnetic tire 30 when there are no lateral forces present acting on the tire 30. With lateral forces present, the air gap can be expected to range from about 8 mm to about 25 mm. Because the sidewall of a tire typically has a pronounced curvature, the mounting bracket 52 preferably provides a pair of skewed (i.e., not parallel) surfaces 54, 56 for the sensors 26, 28 respectively. The mounting bracket 52 may be secured to suspension strut 50 by any suitable means, such as integrally forming mounting bracket 52 with strut 50, using suitable fasteners, e.g., bolts 58 and nuts 60 as shown in FIGS. 4 and 5, or by any other suitable means. The sensors 26, 28 may be secured to mounting bracket 52 by any suitable means, such as using suitable fasteners, e.g., bolts 62 and nuts 64 as shown in FIGS. 4 and 5, or by any other suitable means. Wires 66, 68 place sensors 26, 28 in circuit communication with the force prediction unit 22.

The mounting bracket also preferably secures sensors 26, 28 so that the line segment between them is as parallel as is practicable to the magnetic interface line between successive magnetic bands 38 of magnetic tire 30. In this way, in the free rolling state, the sensors 26, 28 preferably detect the transition from one band 38 to the next at the same time, i.e., there will be no or a small phase difference between the two sensor signals. A torsional deformation, e.g., caused by application of a brake, takes the form of the tire tread 40 rotating with respect to the tire bead 42, so that the tire magnetic interface line is no longer parallel to the line segment between sensors 26, 28. This torsional deformation is detected by the SWT sensors 26, 28 as a change in the phase shift between the two signals, i.e., the transition from one magnetic band 38 to the next will be detected by one sensor sooner or later than it would otherwise be detected by that sensor with respect to the other sensor. The signals from the sensors 26, 28 in this configuration are sinusoidal signals.

The sensors 26, 28 in FIG. 4 and FIG. 5 are positioned at the 180° location (at the 12 o'clock position), which provides the most sensitivity for decoupling circumferential torque and lateral force, $F_y$. Additionally, it is preferable to position a second pair of SWT sensors per tire (not shown) at either the 90° or the 270° position (at the 3 o'clock or 9 o'clock position) to provide the most sensitivity for decoupling circumferential torque and vertical force, $F_z$. However, providing sensors at the 90° or the 270° position has proven to be challenging because sensors in either of those positions tend to be exposed to forces that misalign the sensors or cause the sensor supports to bend or break off. In the alternative, a single pair of SWT sensors positioned at 135° is believed to provide information to decouple circumferential torque from both lateral force, $F_y$, and vertical force, $F_z$. Also in the alternative, a single additional outer sensor can be used at either the 90° or the 270° position rather than using an additional pair of sensors in that position. In that case, the phase of the sensor at the 90° or 270° position would be taken with respect to the inner sensor at the 180° position.

The force prediction unit 22 preferably accepts as inputs at least (a) a phase difference input, relating to (and preferably representing) a change in phase between the signals of the two sensors 26, 28 caused by torsional deformation in the sidewall of the tire and (b) a peak amplitude input from the outer sensor 26 relating to (and preferably representing) the length of the changing air gap between the sensor 26 and the sidewall. More preferably, the force prediction unit 22 also accepts as additional inputs (c) a value relating to (and preferably representing) the speed of the vehicle (which can be determined from the period of each region of one of the SWT sensors, inverted and scaled by the radius of the tire) and (d) a delta input relating to (and preferably representing) the difference between the peak amplitude signal from the outer sensor 26 and the peak amplitude signal of the inner sensor 28. The speed input allows the force prediction unit to take into account the effects on the sidewall of centrifugal forces at higher speeds and the effects of relaxation phenomenon on the tire the at lower speeds. Additionally, certain cross terms such as phase difference input multiplied by peak amplitude input allow force prediction units to be trained with a very low mean sum of squared errors. Thus, force prediction units according to the present invention, such as neural networks and bilinear equation sets, can have as inputs any one or more of the following: one phase difference input for each sensor pair, a peak amplitude input for each sensor, preferably each outer sensor in the pair, a speed input, a delta peak input for each sensor pair, and a cross term (phase difference input multiplied by peak amplitude input) for each sensor pair, among others, with sensor pairs being located at 90° and/or 135° and/or 180° and/or 270°, depending on the force(s) and/or torque(s) to me predicted.

Figure 6:
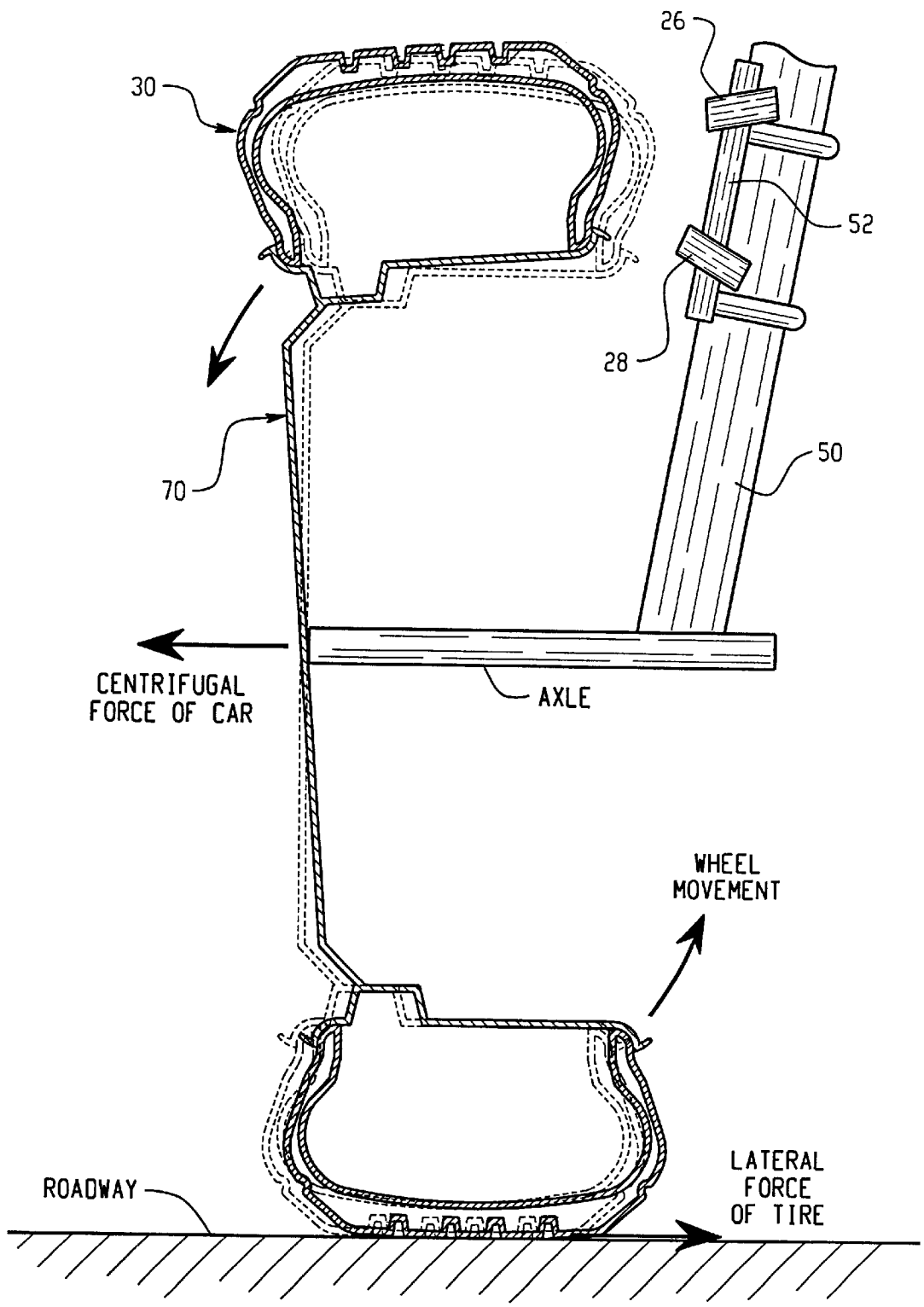
FIG. 6 is a front view of the tire, suspension strut, and sensors showing the effects of a lateral force, with the tire viewed in a section taken vertically.
Figure 7:
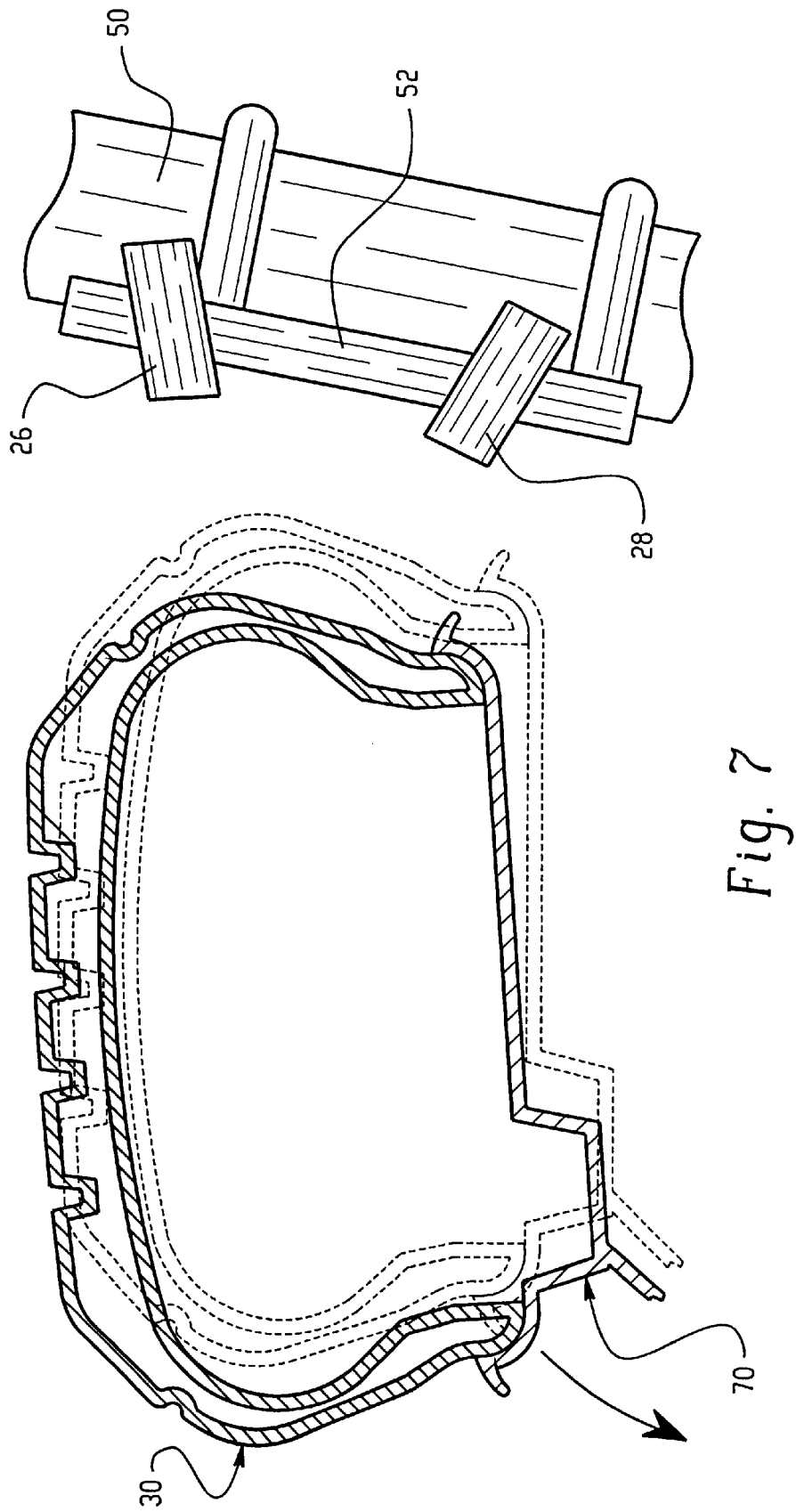
FIG. 7 is a close up view of the tire and sensors of FIG. 6.

Referring now to FIG. 6 and FIG. 7, the effect on the positional relationship between the tire 30 and sensors 26, 28 by a lateral force is shown schematically. The tire 30 and rim 70 are shown in dashed lines in the free rolling state and in solid lines under the influence of a lateral force. In short, the lateral force causes the distance between the sensors 26, 28 and the tire 30 to be greater. A lateral force in the opposite direction to the force shown in FIG. 6 will cause the distance between the sensors 26, 28 and the tire 30 to be less. These differences in distance are reflected in a change in amplitude of the signals from sensors 26, 28.

Figure 8:
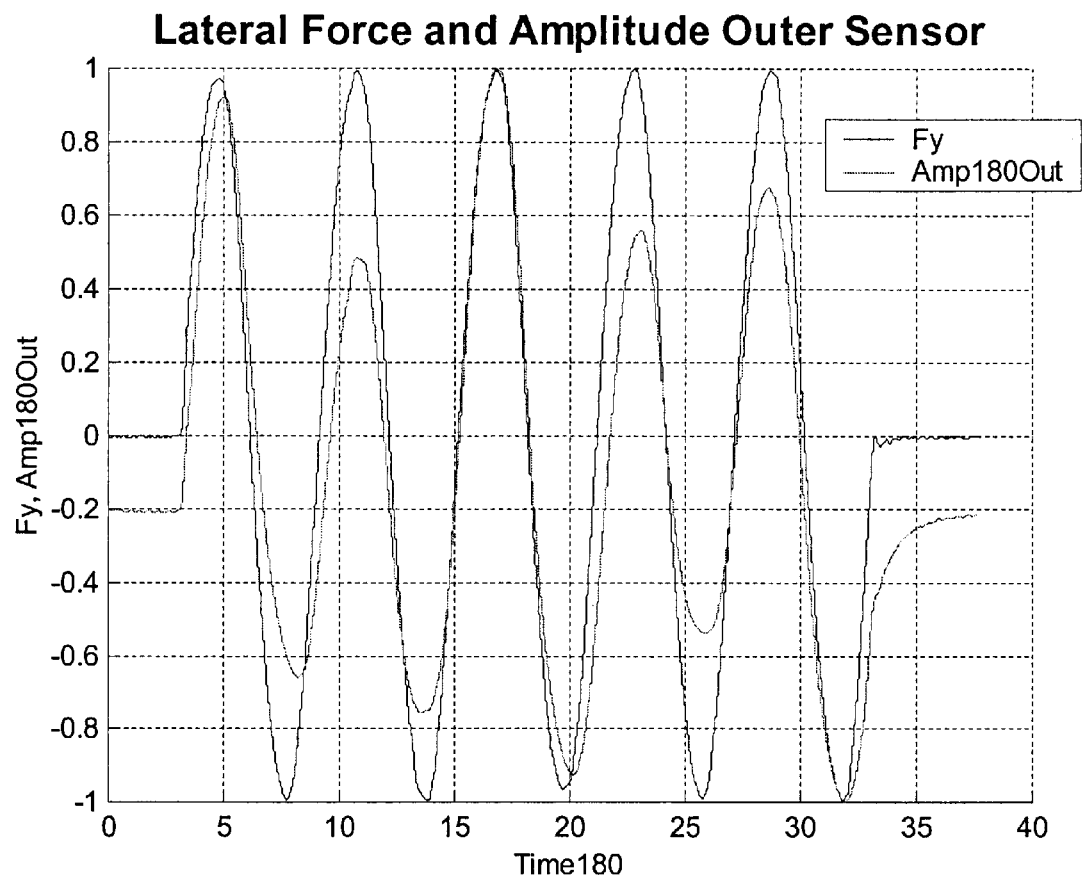
FIG. 8 is a data plot of SWT sensor amplitude taken in the presence of lateral force and circumferential torque, showing that in the presence of torque SWT sensor amplitude is a relatively poor predictor of lateral force.
Figure 9:
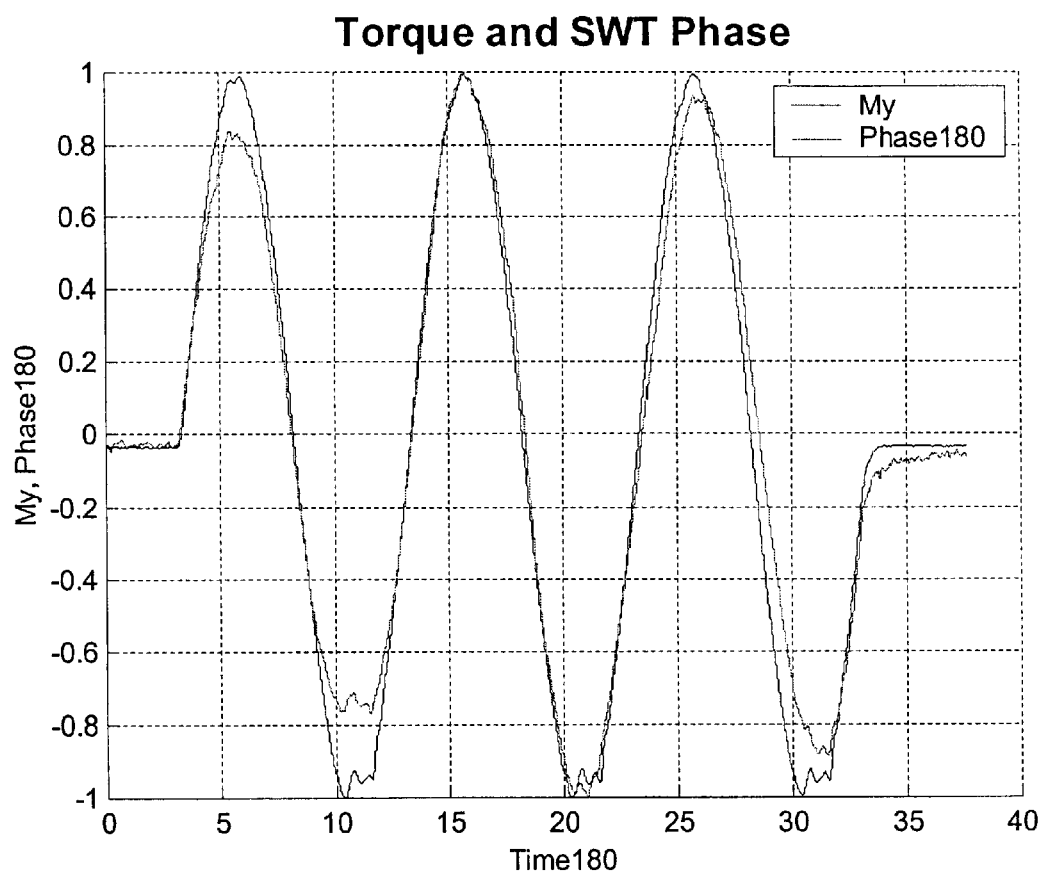
FIG. 9 is a data plot of SWT sensor amplitude taken in the presence of lateral force and circumferential torque, showing that the presence of lateral force causes a cross-term error when using SWT sensor phase difference as a predictor of circumferential torque.

The relatively straightforward conceptual framework for the SWT sensors set forth in the preceding two paragraphs is greatly complicated in application because the lateral force and longitudinal force are coupled to some degree. This is illustrated by FIG. 8 and FIG. 9. FIG. 8 shows plots of normalized lateral force (in the presence of circumferential torque) and normalized amplitude of the outer SWT sensor 26 versus time (data from a Conti Sport Contact, 245/40 R18 magnetic sidewall tire collected with an MTS Model 860 tread wear machine (available from MTS Systems Corporation) in accordance with the data collection section of Example 1). As shown in FIG. 8, in the presence of circumferential torque, the normalized amplitude of the outer SWT sensor 26 is a poor predictor of lateral force. Similarly, FIG. 9 shows plots of normalized circumferential torque (in the presence of lateral force) and normalized phase-shift between the two SWT sensors 26, 28 versus time (data from a Conti Sport Contact, 245/40 R18 magnetic sidewall tire collected with an MTS Model 860 tread wear machine in accordance with the data collection section of Example 1). As shown in FIG. 9, the presence of lateral force apparently causes a cross-term error when using the normalized phase difference between the two SWT sensors 26, 28 as a predictor of circumferential torque.

The present invention overcomes these drawbacks by using the force prediction unit 22 of the present invention, which uses inputs from both SWT sensors 26, 28 to determine both the circumferential torque and the lateral force acting on the tire.

In a first embodiment of the force prediction unit 22 of the present invention, the processor of the force prediction unit 22 implements a neural network either in software or in hardware. Preferably the neural network is configured to determine both the circumferential torque and the lateral force acting on the tire; however, the neural network can be configured to determine any combination or permutation of one or more of any of the following: the lateral force acting on the tire, the circumferential torque acting on the tire, the longitudinal force acting on the tire, the vertical force acting on the tire, and forces and/or torques having any one or more of the foregoing as components thereof. Preferably, the magnitude (amplitude) of the outer SWT sensor 26 and the phase difference between the signals of the two SWT sensors 26, 28 are input to the neural network, with the desired parameters being output. Even more preferably, the difference in magnitude (amplitude) between the signal from the outer SWT sensor 26 and the signal from the inner SWT sensor 28 is used as an additional input. The neural network of the force prediction unit 22 is preferably a multi-layer perceptron, and is even more preferably a multi-layer perceptron having one input layer, one hidden layer (having, e.g., 5–20 nodes), and one output layer. As to transfer functions between layers, a nonlinear, hyperbolic tangent sigmoidal transfer function is preferably used between the input layer and the hidden layer, and a linear transfer function is preferably used between the hidden layer and the output layer. The hyperbolic tangent sigmoidal transfer function is preferably implemented as follows:

$$\text{tansig} = \frac{2}{e^{-2n} - 1} - 1$$

-continued where $n = W \cdot p + b$ $W$ = a matrix of weights, $b$ = a matrix of bias values $p$ = a matrix of input values $W \cdot p$ represents matrix multiplication As expected, the neural network in the force prediction unit 22 must be trained using previously collected data. This training is exemplified by FIG. 10, which is a flowchart 100 showing generally how the neural network in the force prediction unit 22 is trained using previously collected data. Initially, data must be collected, at step 102. In general, the desired forces and torques are collected, e.g., from an instrumented hub or from a dynamometer, along with the raw SWT sensor data. In the preferred embodiment, the circumferential torque and the lateral force acting on the tire, and the raw SWT sensor data, are collected with an MTS Model 860 tread wear machine (available from MTS Systems Corporation) with the frequency of the circumferential torque and lateral force being different prime numbers to provide a fall spectrum of measured and interacting torques and forces. Data is collected, for example, at between 25,000 and 1,000,000 samples per second, and typically at 50,000 samples per second.

Next, at step 104, the raw sinusoidal SWT sensor data is processed to calculate the inputs to the neural network. In the preferred embodiment, the phase and two amplitudes are calculated from the peaks and zero-crossings of the raw SWT sensor data. More specifically, (a) the phase difference is determined as follows: (i) the mean value is subtracted from all the data, (ii) at each peak region and at each valley region a polynomial is fit along the peak or valley, (iii) the maximum/minimum of the resulting polynomial is determined (by, e.g., setting the differential to zero to determine the horizontal tangent), (iv) the time of a peak/valley of one signal is subtracted from the time of the peak/valley of the other signal, and (v) the resulting difference is divided by the corresponding "half-period" (the time from the previous peak/valley to that valley/peak) to make the phase difference independent of vehicle velocity;

(b) the amplitude of the signal from the outer SWT sensor 26 is determined as follows: (i) the mean value is subtracted from all data from sensor 26, (ii) at each peak region and at each valley region a polynomial is fit along the peak or valley, (iii) the maximum/minimum of the resulting polynomial is determined (by, e.g., setting the differential to zero to determine the horizontal tangent), (iv) the processed signal is rectified (by, e.g., taking the absolute value of each data point), and (v) the amplitude of the fit polynomial at each maximum is used as the amplitude of that signal;

(c) the peak difference between the two SWT signal amplitudes is determined as follows: (a) the peak amplitude of the signal from the inner sensor 28 is calculated in accordance with step (b) above is subtracted from the peak amplitude of the signal from the outer sensor 26 as determined at (b) above.

The sinusoidal nature of the signals from the sensors facilitates using the fit polynomial in place of the actual sensor data. Additionally, using the fit polynomial for the phase and amplitude inputs tends to smooth or remove any noise that might otherwise cause erroneous calculations.

Having calculated the phase and two amplitudes, next these inputs are corrected at step 106 using various correction methods. An exemplary correction method is as follows: For a tire magnetized so that there are 48 north and 48 south poles per circumference, the inner and outer SWT sensor signals will be very much like sinusoidal waves with a frequency of 48 wavelengths per tire revolution; i.e., there are 48 "peak" amplitudes and 48 "valley" amplitudes in every tire revolution. If the mean is subtracted from the signal, each revolution would produce 96 "zero" crossings. In addition, if the signal is rectified, turning each valley into a peak, there would be 96 peak amplitudes. NumPoles represents the number of North and South magnetic poles around the circumference of the tire. Thus, for this particular tire the parameter NumPoles is 96. For a uniform velocity, i.e., for a constant speed with no torques or lateral forces acting, the time difference between the zero crossings, or the time difference between the peak amplitudes, defines the pole pitch. If the pole spacing is uniform, there would be 360 degrees/96=3.75 degrees or 2 Pi/96=0.0654 radians between each pole. In practice, however, the pole spacing is rarely perfectly uniform for a particular tire. Thus, there is some error associated with each of the 96 pole spacing values. But this error is due to the geometry and magnetization process applied to the particular tire. The error for each pole spacing value repeats itself with each revolution of the tire. These errors affect not only the pole pitch values, but also the phase differences between the inner and outer SWT sensor signals. With no torques or lateral forces acting on the tire, the phase differences between these two signals will consist of 96 constant values. Thus, the following method can be used to correct the phase errors between poles:

First, (1) SWT phase data is collected at a uniform velocity (no torques or lateral forces). Then, (2) from the vector of phase data collected in (1), calculate the zero crossings (or "mean" crossings) and the peaks and valley amplitudes. Next, (3) rectify the data so that valley amplitudes become peak amplitudes. Then, (4) partition the vectored data into NumPoles sets and ensemble average N of the sets, i.e.:

| Pole number | 1 | 2 | 3 | ... | k | ... | NumPoles |
|---|---|---|---|---|---|---|---|
| set 1 | $p_{11}$ | $p_{12}$ | $p_{13}$ | ... | $p_{1k}$ | ... | $p_{1NumPoles}$ |
| set 2 | $p_{21}$ | $p_{22}$ | $p_{23}$ | ... | $p_{2k}$ | ... | $p_{2NumPoles}$ |
| ... | ... | ... | ... | | ... | | ... |
| set j | $p_{j1}$ | $p_{j2}$ | $p_{j3}$ | ... | $p_{jk}$ | ... | $p_{jNumPoles}$ |
| set N | $p_{N1}$ | $p_{N2}$ | $p_{N3}$ | ... | $p_{Nk}$ | ... | $p_{NNumPoles}$ |
| Average | $ave_1$ | $ave_2$ | $ave_3$ | ... | $ave_k$ | ... | $ave_{NumPoles}$ |

Next, (5) calculate the average (grand mean) of the ensemble averages. Then, (6) subtract the grand mean from the Average vector to form a vector of correction values. Next, (7) subtract the correction values from entire matrix of data collected under the influence of various torques and forces, i.e., correct all the data that has been previously collected. Finally, (8) reshape matrix of data back into a vector.

In the alternative, (9) the data can be filtered data using a running average where the number of points averaged is between 2 and NumPoles.

The amplitude data is corrected in a similar fashion using a multiplicative error correction routine. Perform the same steps 1 through 5 as described in the additive correction error algorithm described above, but apply the steps to the vector of SWT amplitude data. In step 6 however, instead of subtracting the grand mean from the Average, divide the grand mean into the Average to form the vector of correction values. In step 7, multiply the entire matrix of data by the vector of correction values, thereby correcting all the amplitude data. Steps 8 and 9 are performed the same as for the additive correction value.

Next, at step 108, the corrected phase data and two corrected amplitudes are normalized, i.e., scaled to between −1 and +1 by ordinary techniques known to those in the art.

Then the large data set is divided into various sets, e.g., a training set, a validation set, and a test set, at step 110.

Next, the training data set is used to train the neural network, at step 112. Preferably the neural network is trained using the known Levenberg-Marquardt technique with early stopping. Ordinary back-propagation could be used to train the network, but might take a prohibitively long period of time to converge. Preferably the validation data set is used to determine validation error (mean sum of squared errors), which is used to determine when to stop training the neural network so that the neural network properly generalizes and does not fit noise. More preferably, the neural network is trained until the validation error increases for a specific number of iterations, preferably 5 iterations. The weights from the training iteration immediately before the validation error began increasing (6 iterations back) are used as the final weights. In the alternative, the neural network is trained until the mean sum of squared errors for the training data set is equal to or less than 0.0001.

Finally, the weights are tested using the test data set, at task 116, by applying the test data set to the trained neural network and calculating the mean sum of squared errors. If the mean sum of squared errors is relatively low, preferably on the order of about 0.0018, more preferably lower than 0.0018, then the weights have passed this last test. If the mean sum of squared errors is relatively high, i.e., significantly higher than 0.0018, then an alternative neural network structure should be used, e.g., more or fewer hidden neurons, perhaps an additional hidden layer, etc.

Additionally, the neural network weights can be verified and tested using SWT raw data and force and torque data collected from a vehicle having at least one instrumented hub, e.g., Model 242 electronics and Model 6613 wheel sensor, both from GSE, Inc.

It is currently believed that because each type of tire (e.g., a Conti Sport Contact, P245/40 R18 as compared to an Ameri★G4S P205/70 R15 as compared to an Contitrac AW P275/65 R17) has different static and dynamic characteristics, each type of tire will require separate data collection and training. Additionally, specific variations in specific tires of the same type might have different enough characteristics to warrant individualized parameters being used by the force prediction unit 22. Accordingly, the processor in the force prediction unit 22 will need to have some means for using the proper neural network weights with the particular type of magnetic tire 30 on the vehicle 10 or specific tire on the vehicle 10. For example, the force prediction unit 22 might have a plurality of pre-loaded weights, number of layers, number of hidden nodes, etc. for a plurality of different types of tires, in which case the force prediction unit 22 need only be apprised of the particular type of tire 30 mounted on the vehicle 10. The force prediction unit 22 can be apprised of the particular type of tire 30 mounted on the vehicle 10 by a number of means, e.g., having one of the SWT sensors read a magnetic code (e.g., a preselected series of magnetic transitions in the form of a bar code or the like embedded into the tire sidewall) directly from the tire sidewall, communicating with an external device 120 (FIG. 2) such as a selectably connectable computer or interface pendant through which the tire type is selected, etc. so that the force prediction unit 22 can associate the proper weights, number of layers, number of hidden nodes, etc. with the tire mounted on the vehicle. In addition, or in the alternative, the force prediction unit 22 can have communication circuitry to directly or indirectly receive neural network parameters such as weights, number of layers, number of hidden nodes, etc. from an external device 120 (FIG. 2) such as a selectably connectable computer or an interface pendant.

In addition, the neural network is preferably dynamically trained to optimize its weights in real-time. To optimize in real time, the presence of valid training data must be determined. Valid SWT sensor data could be determined using various sensors on the vehicle. For example, ESP systems typically have lateral force accelerometers, which could be used to measure lateral force data correlated with collected SWT sensor data. Additionally, engine torque sensors and other sensors could be used to measure circumferential torque correlated with collected SWT sensor data. Such validated data could be used to retrain the neural network to optimize or otherwise alter the neural network weights.

Figure 11:
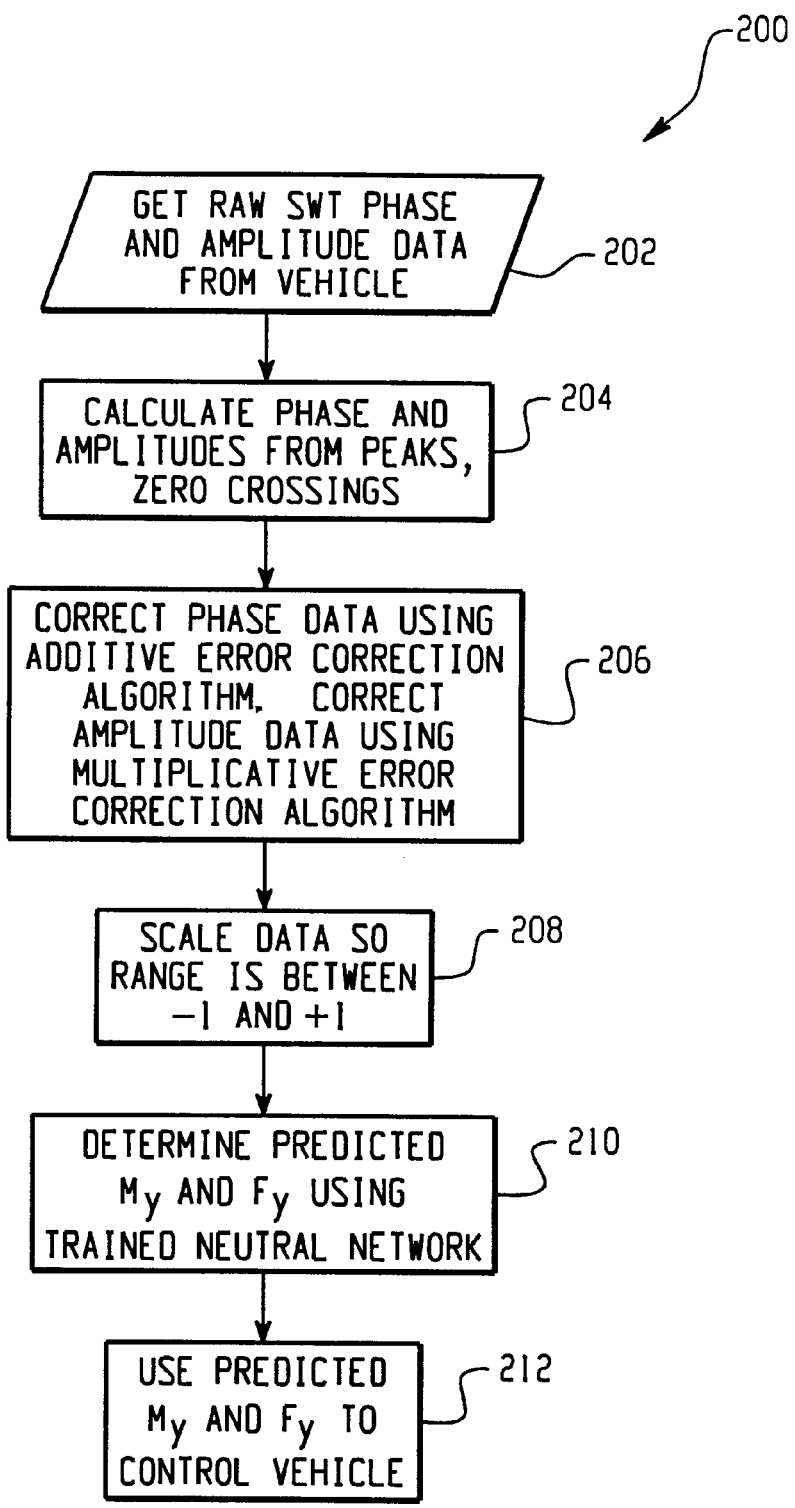
FIG. 11 is a flow chart showing the general procedure for using the trained neural network of the present invention to predict lateral force and circumferential torque.

Referring now to FIG. 11, and also back to FIG. 2, once the neural network is trained and the force prediction unit 22 has loaded and/or associated the weights, number of layers, number of hidden nodes, etc. with the mounted tire 30, the force prediction unit 22 predicts forces acting on the tire 30 as generally set forth in routine 200.

After system initialization, as known to those in the art, data must be collected, at step 202. The raw SWT sensor data is collected in a real-time manner. The raw sensor data is collected, for example, at a rate of at least 100,000 samples per second and input to the processor (e.g., a DSP) in the force prediction unit 22. In the alternative, and preferably, the raw sensor data is collected by analog circuitry that determines mean-crossings (for phase) and peak amplitudes, which are sent to the processor (e.g., a DSP) in the force prediction unit, e.g., by a CAN protocol communications link to be input into the neural network.

Next, at step 204, the raw SWT sensor data is processed to calculate the inputs to the neural network. In the preferred embodiment, the phase and two amplitudes are calculated from the peaks and zero-crossings of the raw SWT sensor data using analog circuitry. For example, the analog circuitry can determine the phase difference with a phase-locked loop (PLL). The analog circuitry can determine the amplitude of the signal from both SWT sensors 26, 28 by integrating each signal, holding at peak values, and returning the peak values. These phase and both peaks are sent to the processor in the force prediction unit, e.g., by a CAN protocol communications link. The processor determines the difference between the two SWT signal amplitudes by subtracting one peak from the other.

Having calculated the phase and two amplitudes, next these inputs are corrected at step 206 using various correction methods. Preferably, the phase data is corrected using the additive correction algorithm discussed above. Preferably, both amplitudes are corrected using the multiplicative error correction algorithm discussed above.

Figure 10:
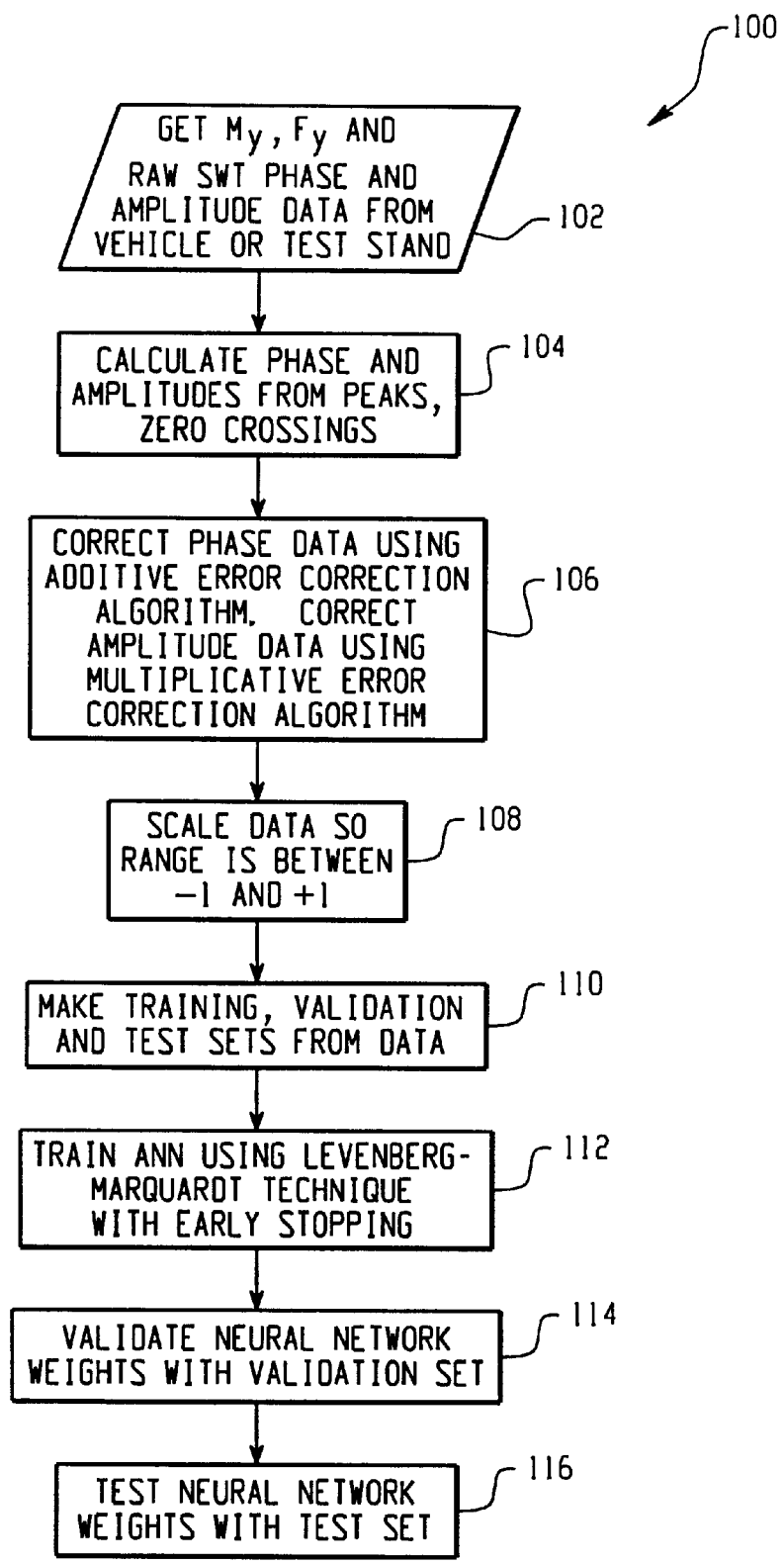
FIG. 10 is a flow chart showing the general procedure used to train the neural network of the present invention.

Next, at step 208, the phase data and two amplitudes are normalized, i.e., scaled to between −1 and +1 by ordinary techniques known to those in the art, using the same normalization parameters used to normalize the data at step 108 of FIG. 10.

Finally, the force prediction unit 22 determines the predicted forces using the scaled, corrected data. In general, the force prediction unit 22 determines any combination or permutation of one or more of any of the following: the lateral force acting on the tire, the circumferential torque acting on the tire, the longitudinal force acting on the tire, the vertical force acting on the tire, and forces and/or torques having any one or more of the foregoing as components thereof. These determined forces and torques are referred to herein as "predicted." Preferably, the force prediction unit 22 determines the predicted circumferential torque on the tire. Preferably, the force prediction unit 22 determines the predicted lateral force acting on the tire. Even more preferably, the force prediction unit 22 determines the predicted lateral force acting on the tire and the predicted circumferential torque acting on the tire.

Finally, at task 212, the control unit 32 alters the dynamic state of the vehicle 20 via actuators 34 responsive to the force(s) and/or torque(s) predicted by the force prediction unit 22. In addition, or in the alternative, the control unit can produce a qualitative or quantitative display of any desired parameter on a display unit (not shown). Qualitative displays can be made by comparing predicted forces and/or torques to baseline or threshold forces and/or torques and displaying an appropriate display based on the results of the comparison. Quantitative displays can be numeric displays of predicted force(s) and/or torque(s), and/or values derived therefrom.

In a second embodiment of the force prediction unit 22 of the present invention, the processor of the force prediction unit 22 implements a bilinear equation in software or in hardware. Preferably there are two bilinear equations—one for lateral force and one for circumferential torque. However, the force prediction unit 22 can be configured to determine any combination or permutation of one or more of any of the following using one bilinear equation for each predicted force or torque: the lateral force acting on the tire, the circumferential torque acting on the tire, the longitudinal force acting on the tire, the vertical force acting on the tire, and forces and/or torques having any one or more of the foregoing as components thereof. Preferably, the magnitude (amplitude) of the outer SWT sensor 26 and the phase difference between the signals of the two SWT sensors 26, 28 are used in each bilinear equation. Even more preferably, the difference in magnitude (amplitude) between the signal from the outer SWT sensor 26 and the signal from the inner SWT sensor 28 is used as an additional variable in each bilinear equation. Thus, the bilinear equations are preferably of the form:

$$M_y = k_1 + k_2 \cdot p + k_3 \cdot a + k_4 \cdot d + k_5 \cdot p \cdot a$$

$$F_y = k_6 + k_7 \cdot p + k_8 \cdot a + k_9 \cdot d + k_{10} \cdot p \cdot a$$

Where,
p=SWT Phase at 180 degree position, in radians
a=SWT Amplitude of outer sensor 26 at 180 degree position, in mm
d=Difference between SWT outer and inner amplitudes, in mm
$M_y$=Circumferential torque, kN–m
$F_y$=Lateral force, kN
$k_1$–$k_{10}$=constants from bilinear fit The constants $k_1$–$k_{10}$ are determined using standard multiple linear regression techniques, which are known to those in the art. More specifically, the bilinear equations are determined as follows. First, steps 102 through 108 are performed as discussed in the text accompanying steps 102–108, resulting in a set of corrected, normalized data. Then the constants $k_1$–$k_{10}$ are calculated in MATLAB by regressing Y on X as follows:

$$X = [\text{ones}(n,1)X];$$

$$XTXI = \text{inv}(X'*X);$$

$$COEF = XTXI*X'*Y;$$

where:
n is the number of samples
X is a matrix containing all the phase data, amplitude data, delta data, and phase * amplitude data
Y is the vector of predicted forces/torques Using the bilinear equation embodiment of the force prediction unit of the present invention is identical to the flowchart of FIG. 11, except at step 210, the force(s) and/or torque(s) are predicted using the bilinear equations rather than using a neural network.

Although the bilinear equations do not appear to perform as well as the trained neural network (see examples below), the predictions from the bilinear equations might well suffice under certain circumstances.

In addition to the forces and torques described above, the present invention can be applied to derive or determine various calculated values that are useful for vehicle control systems. For example, coefficients of friction can be calculated from $F_x$, $F_x$, and $F_z$ determined by the present invention (e.g., by using $F_z/F_y$ and $F_z/F_x$). As another example, yaw rate for the vehicle can be determined by solving the appropriate vehicle dynamics equations that involve integrating the predicted force equations to calculate the appropriate angular rate or angular velocity associated with the yaw moments, determined by the present invention.

EXAMPLE 1

Neural Network

First, a Conti Sport Contact, 245/40 R18 magnetic sidewall tire was prepared as generally described in U.S. Pat. No. 5,895,854 and copending U.S. patent application Ser. No. 09/347,757, with 200 phr (arts per hundred) of strontium ferrite powder embedded in the sidewall prior to curing. The embedded strontium ferrite was magnetized to magnetic saturation using 96 electromagnets providing 48 North poles alternating with 48 South poles.

Next, the Conti Sport Contact tire was mounted on an MTS Model 860 tread wear machine (available from MTS Systems Corporation) as follows: The magnetic sidewall tire was mounted to a precision rim. Two pairs of SWT sensors (Philips KMZ10A magneto-resistive sensors) were mounted to a strut fixed to the MTS machine, with one outer and inner pair at 180° and one outer and inner pair at 90°, with each sensor pair using the bracket shown in FIGS. 4 and 5 positioned approximately 12.5 mm from the surface of the sidewall with the tire at rest.

Figure 12:
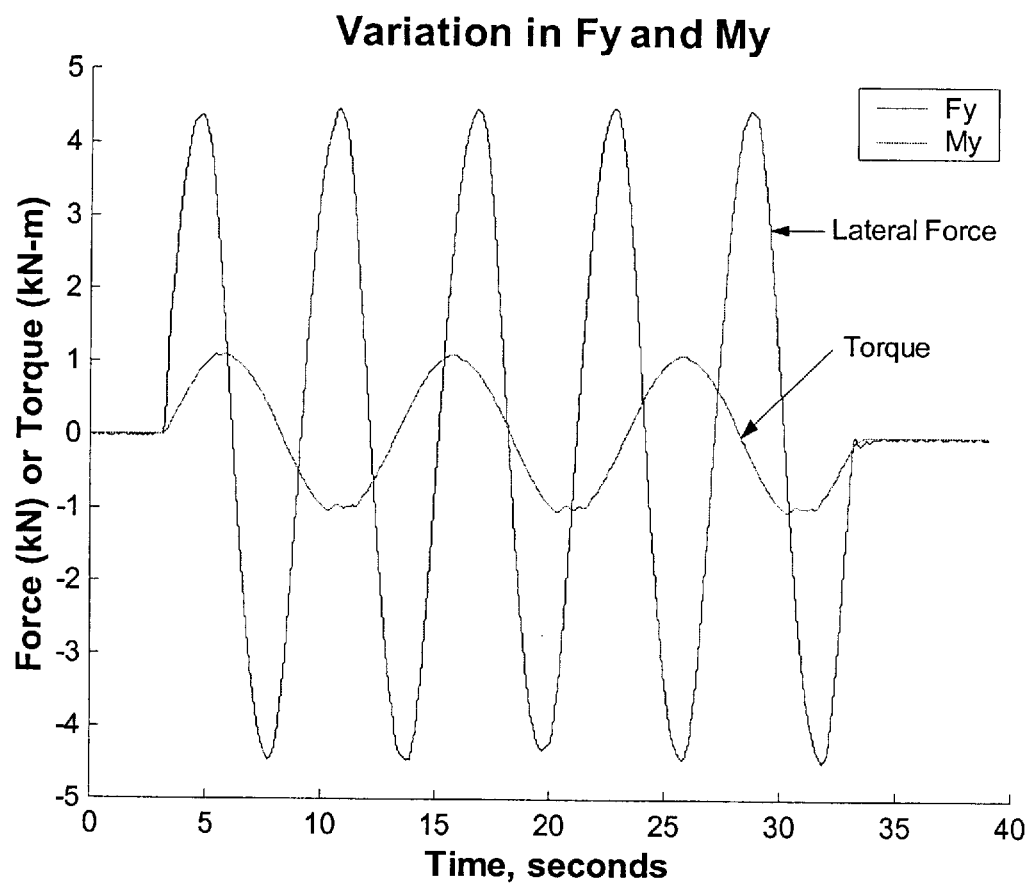
FIG. 12 is a data plot showing the lateral force and circumferential torque applied to the tire during data acquisition.

With the Conti Sport Contact tire mounted in the MTS Model 860 tread wear machine, lateral force, $F_y$ and Torque, $M_y$, were varied sinusoidally as shown in FIG. 12, with the lateral force being varied sinusoidally at 0.1667 Hz and the torque being varied sinusoidally at 0.100 Hz. The tire was rotated at a fixed, simulated speed of 50 miles per hour.

Under these circumstances, 30 seconds (750,000 samples) of data, i.e., the circumferential torque, the lateral force, and the vertical force acting on the tire, the inflation pressure, and the raw SWT sensor data, were collected at 25,000 samples per second.

Next, the raw SWT sensor data was processed to calculate the inputs to the neural network, i.e., the phase difference between the two sensor signals in radians, the amplitude of the signal from the outer sensor 26 in millimeters, and the difference in amplitude between the two sensors 26, 28 in millimeters were calculated from the peaks and zero-crossings of the raw SWT sensor data. More specifically, the phase difference was determined using the polynomial fit method described above, the amplitude of the signal from the outer SWT sensor 26 was determined using the peak of the polynomial fit described above, and the difference between the two SWT signal amplitudes was determined using the difference between peaks found using the polynomial fit described above.

Having calculated the phase and two amplitudes, next these input were corrected using the additive correction algorithm described above and both amplitudes were corrected using the multiplicative error correction algorithm described above.

Next, the phase data and two amplitudes were normalized, i.e., scaled to between −1 and +1 by subtracting the maximum value from the minimum value for each parameter, and dividing by the minimum value, and multiplying the resulting value by each data set.

Then the large data set was divided into three sets, i.e., a training set, a validation set, and a test set.

Figure 13:
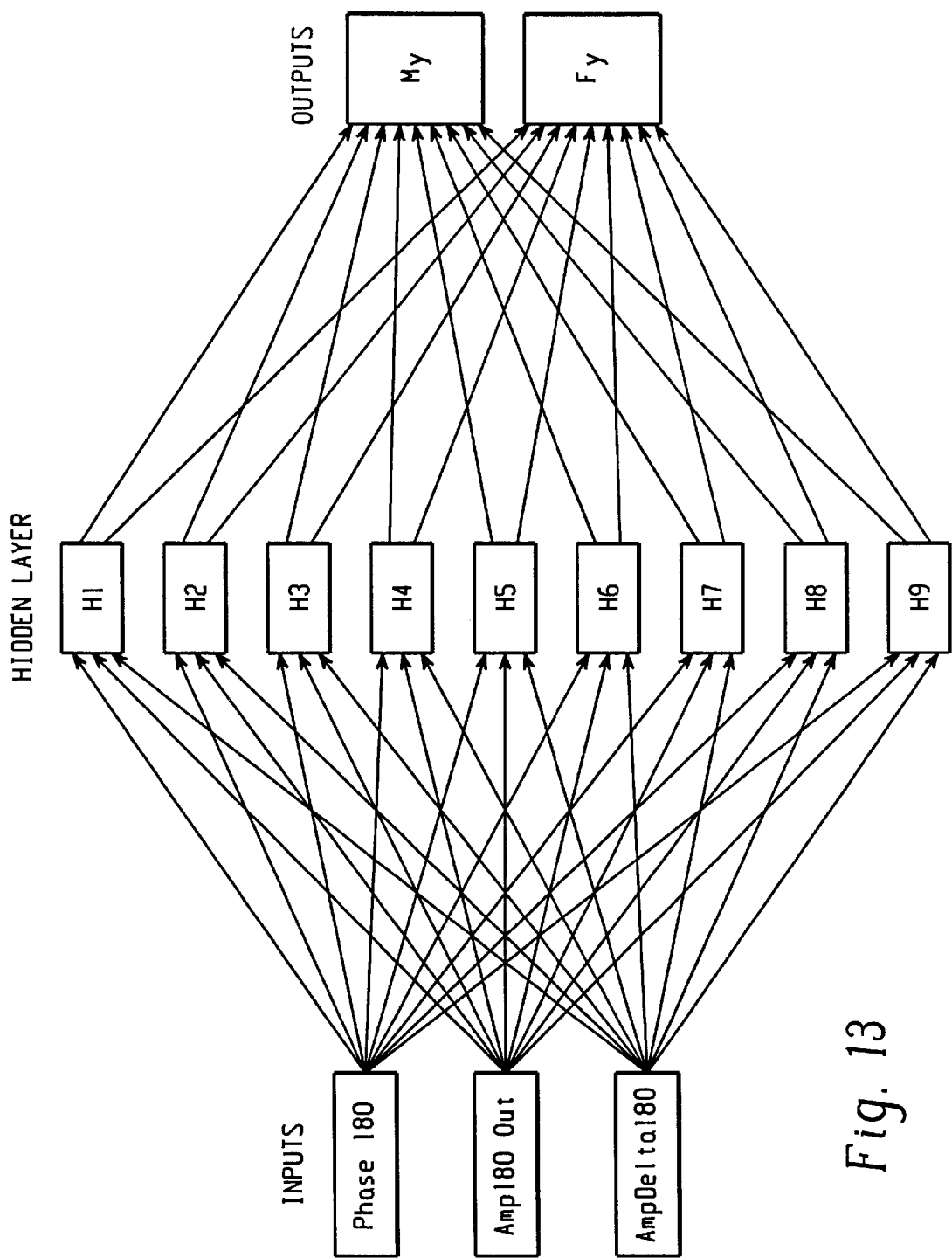
FIG. 13 is a schematic block diagram showing the structure of the neural network trained in Example 1.

Next, a specific structure was selected for the neural network. For this particular example, a single hidden layer having nine hidden nodes was used, as shown in FIG. 13. A hyperbolic tangent sigmoidal function was used between the inputs and hidden layer. A linear function was used between the hidden layer and outputs. The "180" in the three inputs (Phase 180, Amp 180 Out, and Amp Delta 180) in FIG. 13 refer to the fact that the sensors 26, 28 were mounted at, and thus the data was collected from, the "12 o'clock" position of the tire, i.e., the top of the tire sidewall as viewed on the vehicle. The 90° data could be used to determine the vertical force, $F_z$.

Next, the training data set was used to train the neural network with Matlab using the following Matlab neural network object:

Neural Network object:
  architecture:
    numInputs: 1
    numLayers: 2
    biasConnect: [1; 1]
    inputConnect: [1; 0]
    layerConnect: [0 0; 1 0]
    outputConnect: [0 1]
    targetConnect: [0 1]
    numOutputs: 1 (read-only)
    numTargets: 1 (read-only)
    numInputDelays: 0 (read-only)
    numLayerDelays: 0 (read-only)
  subobject structures:
    inputs: {1×1 cell} of inputs
    layers: {2×1 cell} of layers
    outputs: {1×2 cell} containing 1 output
    targets: {1×2 cell} containing 1 target
    biases: {2×1 cell} containing 2 biases
    inputweights: {2×1 cell} containing 1 input weight
    layerweights: {2×2 cell} containing 1 layer weight
  functions:
    adaptFcn: 'adaptwb'
    initFcn: 'initlay'
    performFcn: 'mse'
    trainFcn: 'trainlm'
  parameters:
    adaptParam: .passes
    initParam: (none)
    performParam: (none)
    trainParam: .epochs, .goal, $.max_{13}fail$, $.mem_{13}reduc$, $.min_{13}grad$, .mu, $.mu_{13}dec$, $.mu_{13}inc$, $.mu_{13}max$, .show, .time
  weight and bias values:
    IW: {2×1 cell} containing 1 input weight matrix
    LW: {2×2 cell} containing 1 layer weight matrix
    b: {2×1 cell} containing 2 bias vectors
  other:
    userdata: (user stuff)

The neural network was trained with Matlab using the Levenberg-Marquardt technique with early stopping. More specifically, the neural network was trained until a validation stop (validation set error increased for five consecutive epochs) occurred at epoch 104. The mean sum of squared errors for the training set at epoch 99 was 0.00176. The mean sum of squared errors for the validation set at epoch 99 was 0.00178.

Using this procedure, the following weights between the inputs and the hidden layer were determined:

|    | Phase180 | Amp180Out | AmpDelta180 |
|----|----------|-----------|-------------|
| H1 | 7.5750   | −0.3542   | 0.1623      |
| H2 | 5.1831   | −7.7037   | −0.7410     |
| H3 | −2.4434  | 5.5960    | 0.8778      |
| H4 | −0.1242  | 0.9222    | −1.3954     |
| H5 | 5.4329   | −7.8189   | −1.0483     |
| H6 | −0.1375  | 0.6883    | −0.3193     |
| H7 | 5.6597   | 3.0346    | −0.9307     |
| H8 | 0.8117   | 1.3816    | −0.5938     |
| H9 | 1.0578   | −1.2053   | 1.1388      |

Additionally, the following weights between the hidden layer and the outputs were determined:

|       | H1      | H2      | H3      | H4      | H5      | H6      | H7      | H8      | H9     |
|-------|---------|---------|---------|---------|---------|---------|---------|---------|--------|
| $M_y$ | −0.2718 | 0.2565  | −0.0748 | 0.2405  | −0.2624 | −1.2731 | 0.2896  | 0.6869  | 0.7063 |
| $F_y$ | 0.5201  | −1.3359 | 0.0085  | −1.0817 | 1.3245  | 4.5544  | −0.1567 | −0.1339 | 0.1094 |

The following bias weights between the inputs and the hidden layer were determined:

|    |         |
|----|---------|
| H1 | −7.8421 |
| H2 | −0.9515 |
| H3 | 1.5128  |
| H4 | −0.1678 |
| H5 | −0.9816 |

-continued

| H6 | −0.7893 |
| H7 | −4.8751 |
| H8 | 0.3697 |
| H9 | 0.5579 |

Finally, the following bias weights between the hidden layer and the outputs were determined:

| $M_y$ | −1.2825 |
| $F_y$ | 3.2547 |

These particular weights are considered to be valid because the training set, the validation set and the test set all had a mean sum of squared errors that were below 0.002 (all were about 0.00178).

Figure 14:
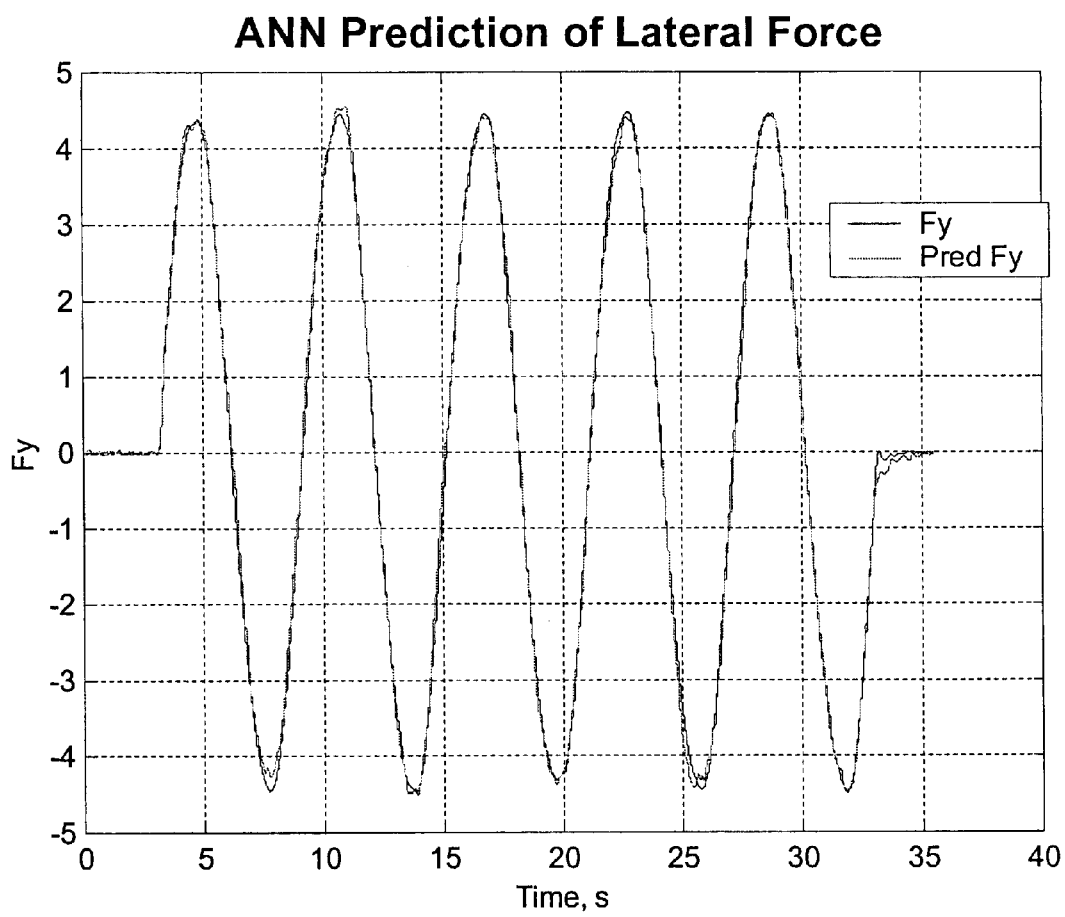
FIG. 14 is a data plot showing measured lateral force and the lateral force predicted by the trained neural network of Example 1.
Figure 15:
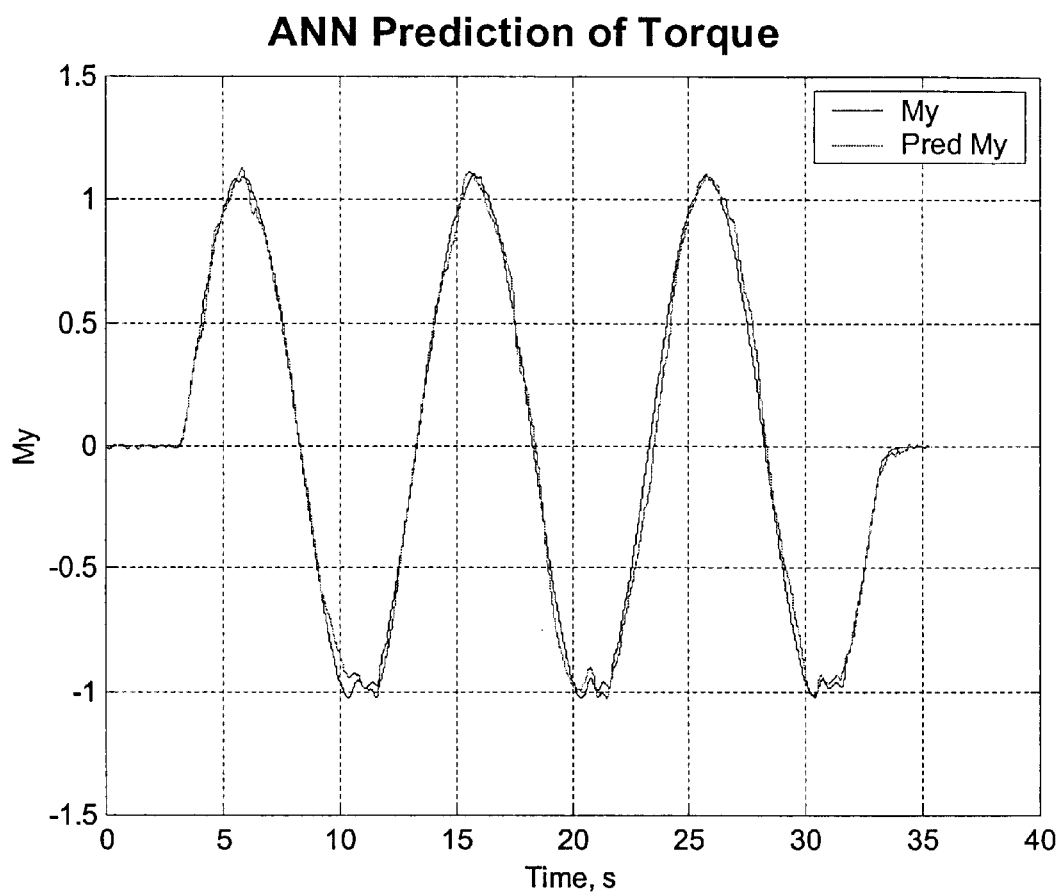
FIG. 15 is a data plot showing measured circumferential torque and the circumferential torque predicted by the trained neural network of Example 1.

FIGS. 14 and 15 show a graphical representation of the closeness of the predictions as compared to measured data in the validation set. Using these weights, the lateral force predicted by the neural network is very close to the measured lateral force in the validation set. Similarly, the circumferential torque predicted by the neural network is very close to the measured circumferential torque in the validation set

EXAMPLE 2

Bilinear Equations

In this example, the data from Example 1 was used to determine a pair of bilinear equations to predict lateral force and circumferential torque.

The constants for the two equations were calculated with Matlab using the multiple linear least squares regression technique.

Using the above procedure, the following bilinear equations were determined to predict lateral force and circumferential torque:

$$M_y = -5.9835 + 7.4517p - 0.7741a + 0.3313d + 0.7102p \cdot a$$

$$F_y = -39.6433 + 7.7312p + 6.2483a + 9.7848d - 2.8222p \times a$$

Figure 16:
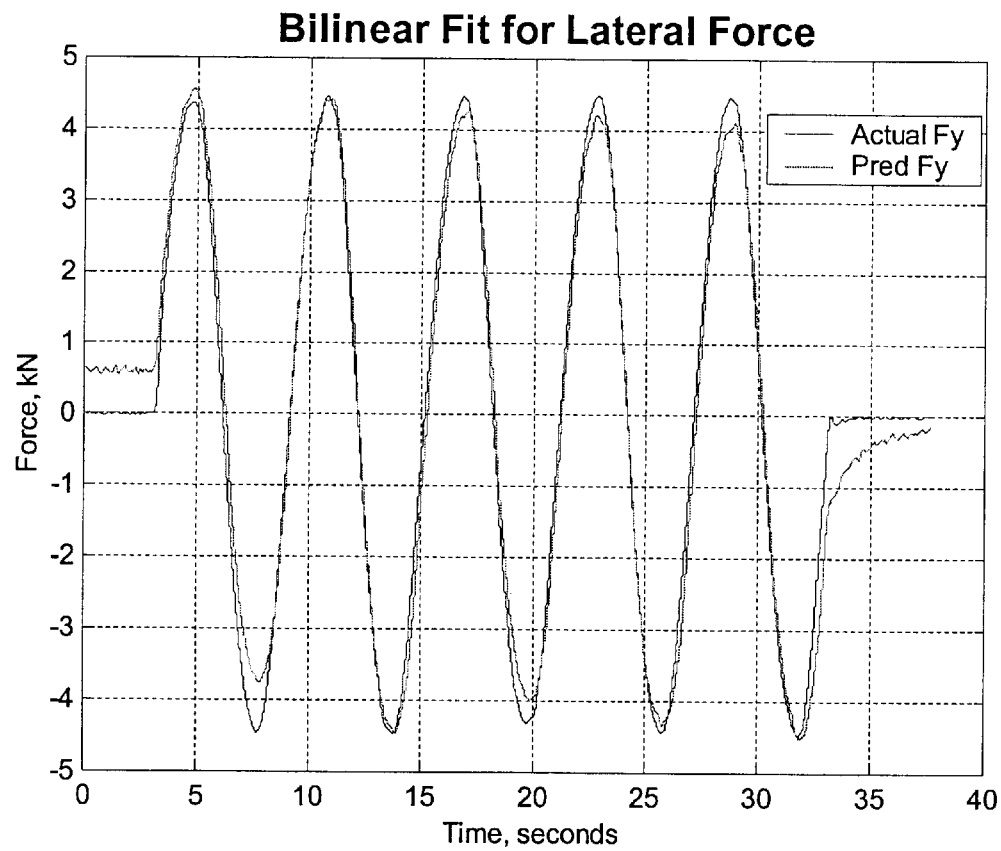
FIG. 16 is a data plot showing measured lateral force and the lateral force predicted by the bilinear equations of Example 2.
Figure 17:
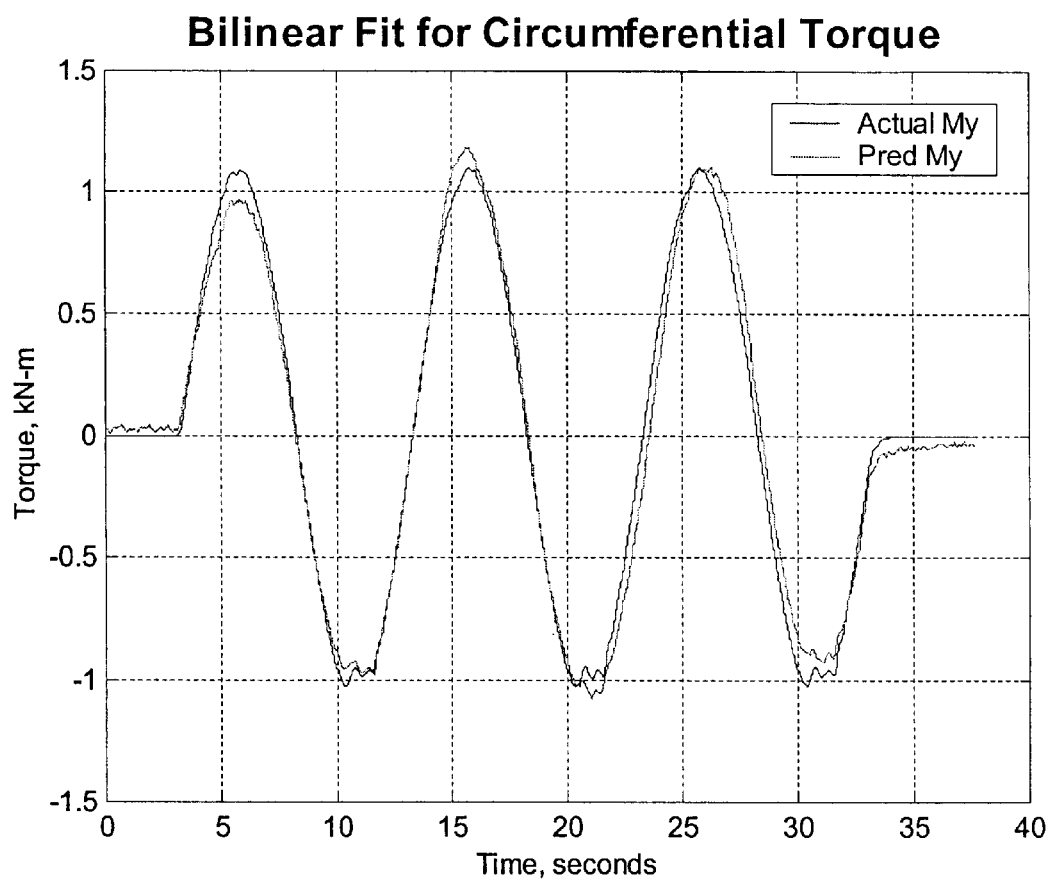
FIG. 17 is a data plot showing measured circumferential torque and the circumferential torque predicted by the bilinear equations of Example 2.

Where,
p=SWT Phase at 180 degree position, in radians
a=SWT Amplitude of outer sensor 26 at 180 degree position, in mm
d=Difference between SWT outer and inner amplitudes, in mm
$M_y$=Circumferential torque, kN–m
$F_y$=Lateral Force, kN FIGS. 16 and 17 show graphical representations of the closeness of the predictions as compared to measured data in the validation set. Using these bilinear equations, the predicted lateral force is close to the measured lateral force in the validation set. Similarly, the predicted circumferential torque is close to the measured circumferential torque in the validation set. Although the predictions made by the bilinear equations are not as close as the predictions made by the neural network, as can be seen by inspection of FIGS. 14–17, the bilinear equations provide reasonably accurate predictions, which can be useful and usable for various applications. Additionally, the greatest deviation between predicted and measured values appears to be when there is no force or torque being applied.

EXAMPLE 3

Neural Network

An Contitrac AW P275/65 R17 magnetic sidewall tire was prepared as generally described in U.S. Pat. No. 5,895,854 and copending U.S. patent application Ser. No. 09/347,757, with 200 phr (parts per hundred) of strontium ferrite powder embedded in the sidewall prior to curing. The embedded strontium ferrite was magnetized to magnetic saturation using 96 electromagnets providing 48 North poles alternating with 48 South poles.

Next, the Contitrac AW P275/65 R17 tire was mounted on an MTS Model 860 tread wear machine (available from MTS Systems Corporation) as follows: The magnetic sidewall tire was mounted to a precision rim. Two pairs of SWT sensors (Philips KMZ10A magneto-resistive sensors) were mounted to a strut fixed to the MTS machine, with one outer and inner pair at 180° and one outer and inner pair at 90°, with each sensor pair using the bracket shown in FIGS. 4 and 5 positioned approximately 12.5 mm from the surface of the sidewall with the tire at rest.

With the Contitrac AW P275/65 R17 tire mounted in the MTS Model 860 tread wear machine, vertical force, $F_z$, lateral force, $F_y$, and Torque, $M_y$, were varied sinusoidally similar to Example 1, with the vertical force being varied sinusoidally at 0.25 Hz, the lateral force being varied sinusoidally at 0.15 Hz, and the torque being varied sinusoidally at 0.100 Hz. The tire was rotated at a fixed, simulated speed of 50 miles per hour.

Under these circumstances, 20 seconds (500,000 samples) of data, i.e., the circumferential torque, the lateral force, and the vertical force acting on the tire, the inflation pressure, and the raw SWT sensor data, were collected at 25,000 samples per second.

Next, the raw SWT sensor data was processed to calculate the eight inputs to the neural network, i.e., (1) the phase difference between the two 180° sensor signals in radians (Phase180), (2) the amplitude of the signal from the outer 180° sensor in millimeters (Amp 180Out or Amp180), (3) the difference in amplitude between the two 180° sensors in millimeters (AmpDelta180 or Delta180), (4) the phase difference between the two 90° sensor signals in radians (Phase90), (5) the amplitude of the signal from the outer 90° sensor in millimeters (Amp90Out or Amp180), (6) the difference in amplitude between the two 90° sensors in millimeters (AmpDelta90 or Delta90), (7) Phase180× Amp180Out (after the correction routine was performed) (pxA180), and (8) Phase90×Amp90Out (after the correction routine was performed) (pxA90) were calculated from the peaks and zero-crossings of the raw SWT sensor data. More specifically, the phase differences were determined using the polynomial fit method described above, the amplitudes of the signals from the outer SWT sensors were determined using the peaks of the polynomial fit described above, and the differences between the two signal amplitudes were determined using the differences between peaks found using the polynomial fit described above.

Having calculated the eight phase and two amplitudes, next these inputs were corrected using the additive correction algorithm described above and both amplitudes were corrected using the multiplicative error correction algorithm described above.

Next, the eight inputs were normalized, i.e., scaled to between−1 and+1 by subtracting the maximum value from the minimum value for each parameter, and diving by the minimum value, and multiplying the resulting value by each data set.

Then the large data set was divided into three sets, i.e., a training set, a validation set, and a test set.

Next, a specific structure was selected for the neural network. For this particular example, a single hidden layer having six hidden nodes was used. A hyperbolic tangent sigmoidal function was used between the inputs and hidden layer. A linear function was used between the hidden layer and outputs.

Next, the training data set was used to train the neural network with Matlab using the following Matlab neural network object:

Neural Network object:
  architecture:
    numInputs: 1
    numLayers: 2
    biasConnect: [1; 1]
    inputConnect: [1; 0]
    layerConnect: [0 0; 1 0]
    outputConnect: [0 1]
    targetConnect: [0 1]
    numOutputs: 1 (read-only)
    numTargets: 1 (read-only)
    numInputDelays: 0 (read-only)
    numLayerDelays: 0 (read-only)
  subobject structures:
    inputs: {1×1 cell} of inputs
    layers: {2×1 cell} of layers
    outputs: {1×2 cell} containing 1 output
    targets: {1×2 cell} containing 1 target
    biases: {2×1 cell} containing 2 biases
    inputweights: {2×1 cell} containing 1 input weight
    layerweights: {2×2 cell} containing 1 layer weight
  functions:
    adaptFcn: 'adaptwb'
    initFcn: 'initlay'
    performFcn: 'mse'
    trainFcn: 'trainlm'
  parameters:
    adaptParam: .passes
    initParam: (none)
    performParam: (none)
    trainParam: .epochs, .goal, .max_13 fail, .mem_13 reduc, .min_13 grad, .mu, .mu_13 dec, .mu_13 inc, .mu_13 max, .show, .time
  weight and bias values:
    IW: {2×1 cell} containing 1 input weight matrix
    LW: {2×2 cell} containing 1 layer weight matrix
    b: {2×1 cell} containing 2 bias vectors
  other:
    userdata: (user stuff)

The neural network was trained with Matlab using the Levenberg-Marquardt technique with early stopping. More specifically, the neural network was trained until a validation stop (validation set error increased for five consecutive epochs) occurred at epoch 81. The mean sum of squared errors for the training set at epoch 76 was 0.00023. The mean sum of squared errors for the validation set at epoch 76 was 0.0003.

Using this procedure, the following weights between the inputs and the hidden layer were determined:

|    | Phase180 | Amp180  | Delta180 | Phase90 | Amp90   | Delta90 | pxA180  | pxA90   |
|----|----------|---------|----------|---------|---------|---------|---------|---------|
| H1 | −3.1924  | 0.1511  | −0.2810  | 0.0578  | −2.4559 | 1.3095  | 2.6048  | −0.1632 |
| H2 | 0.2276   | 0.1292  | 0.0095   | −0.0452 | −0.1124 | 0.1021  | −0.5314 | 0.0715  |
| H3 | 4.0264   | −2.7292 | 6.4593   | −1.7411 | −0.9765 | 0.2611  | −4.0561 | 1.8814  |
| H4 | −3.4893  | 1.6882  | −0.4483  | −0.5887 | −0.6309 | −0.4819 | 3.8759  | 0.3948  |
| H5 | 0.1973   | 0.0347  | −0.3096  | 0.2210  | −0.4999 | 0.5343  | −0.4009 | −0.0815 |
| H6 | −0.3868  | −1.3459 | 1.1311   | −0.2410 | 3.6300  | −2.9317 | 0.7292  | 0.3695  |

Additionally, the following weights between the hidden layer and the outputs were determined:

|       | H1      | H2      | H3     | H4      | H5      | H6     |
|-------|---------|---------|--------|---------|---------|--------|
| $M_y$ | −0.1101 | −3.4672 | 0.0003 | 0.0521  | 0.5608  | 0.9396 |
| $F_y$ | −0.0784 | 3.3440  | 0.0104 | −0.5603 | −3.7565 | 0.1112 |
| $F_z$ | −4.7038 | 8.4356  | 0.3594 | 1.6993  | 11.3365 | 5.3866 |

The following bias weights between the inputs and the hidden layer were determined:

| H1 | 1.4653  |
|----|---------|
| H2 | 0.3718  |
| H3 | −1.3782 |
| H4 | 0.5840  |
| H5 | 0.2758  |
| H6 | 0.7870  |

Finally, the following bias weights between the hidden layer and the outputs were determined:

| $M_y$ | 0.7171  |
|-------|---------|
| $F_y$ | −0.0399 |
| $F_z$ | −6.2700 |

These particular weights are considered to be valid because the training set, the validation set and the test set all had a mean sum of squared errors that were below 0.002 (all were about 0.0003 or less).

Figure 18:
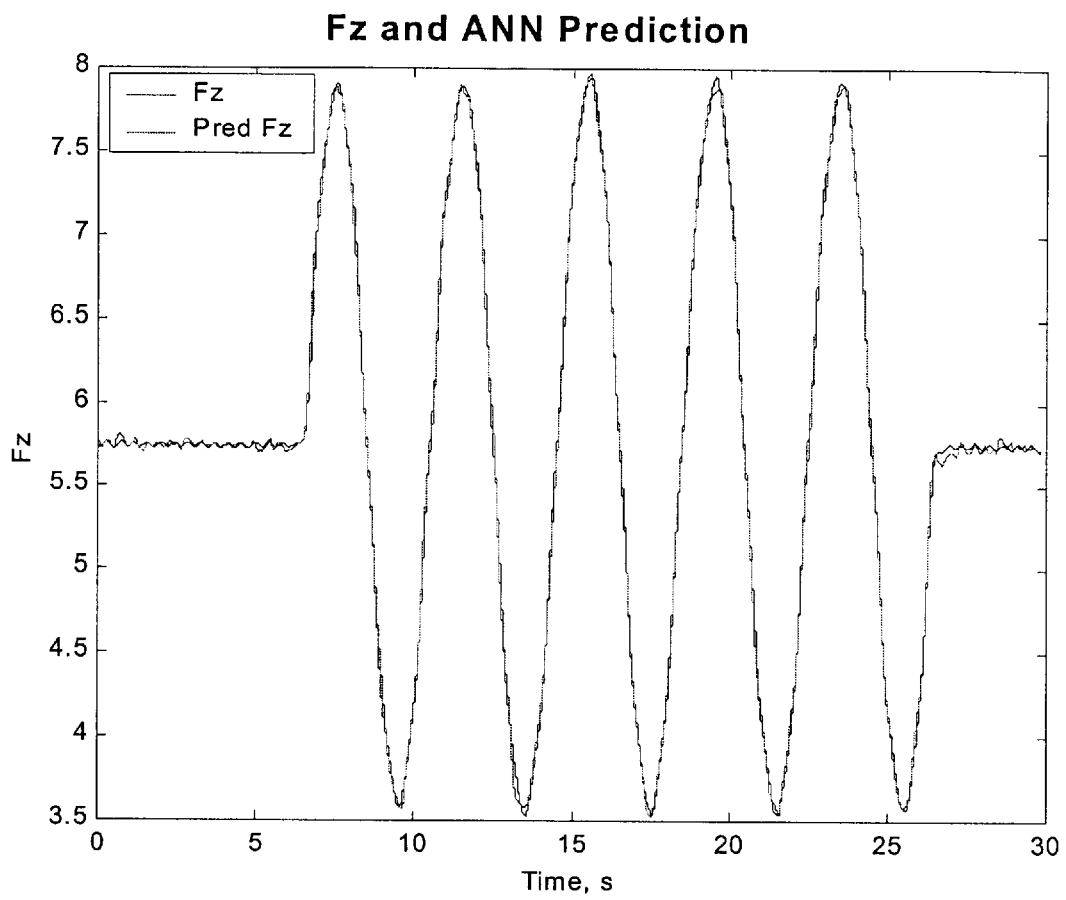
FIG. 18 is a data plot showing measured vertical force and the vertical force predicted by the trained neural network of Example 3.
Figure 19:
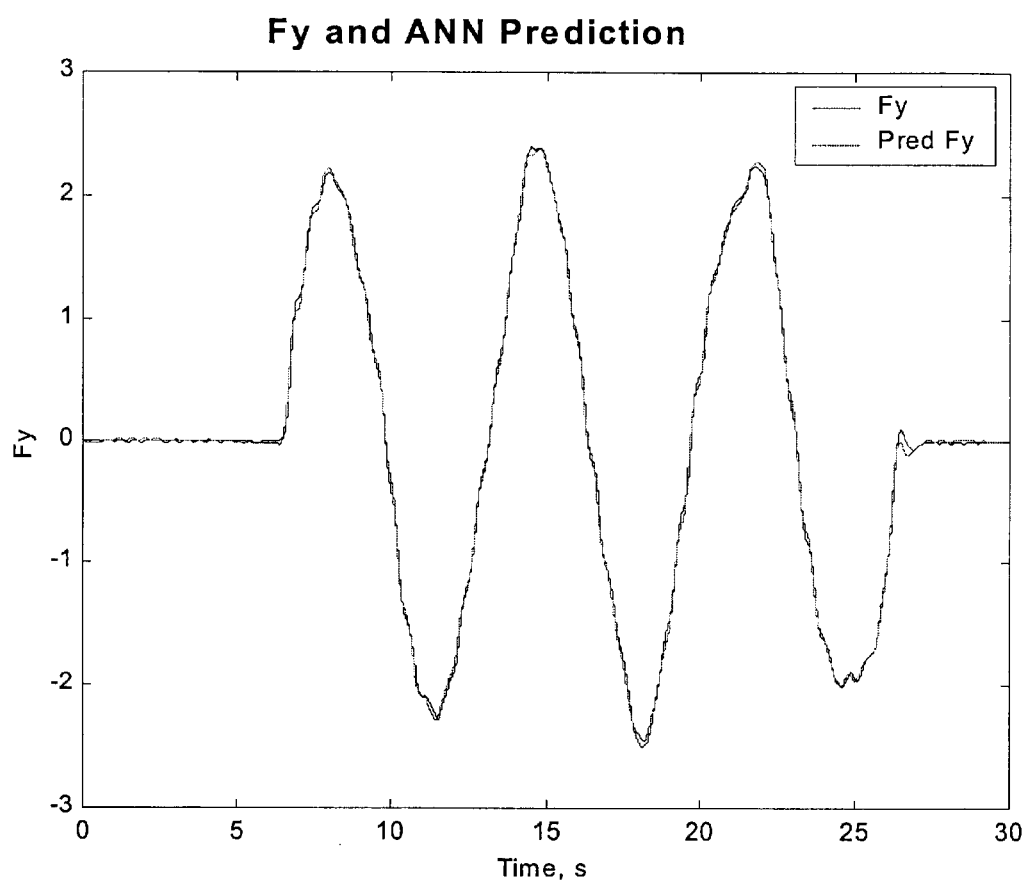
FIG. 19 is a data plot showing measured lateral force and the lateral force predicted by the trained neural network of Example 3.
Figure 20:
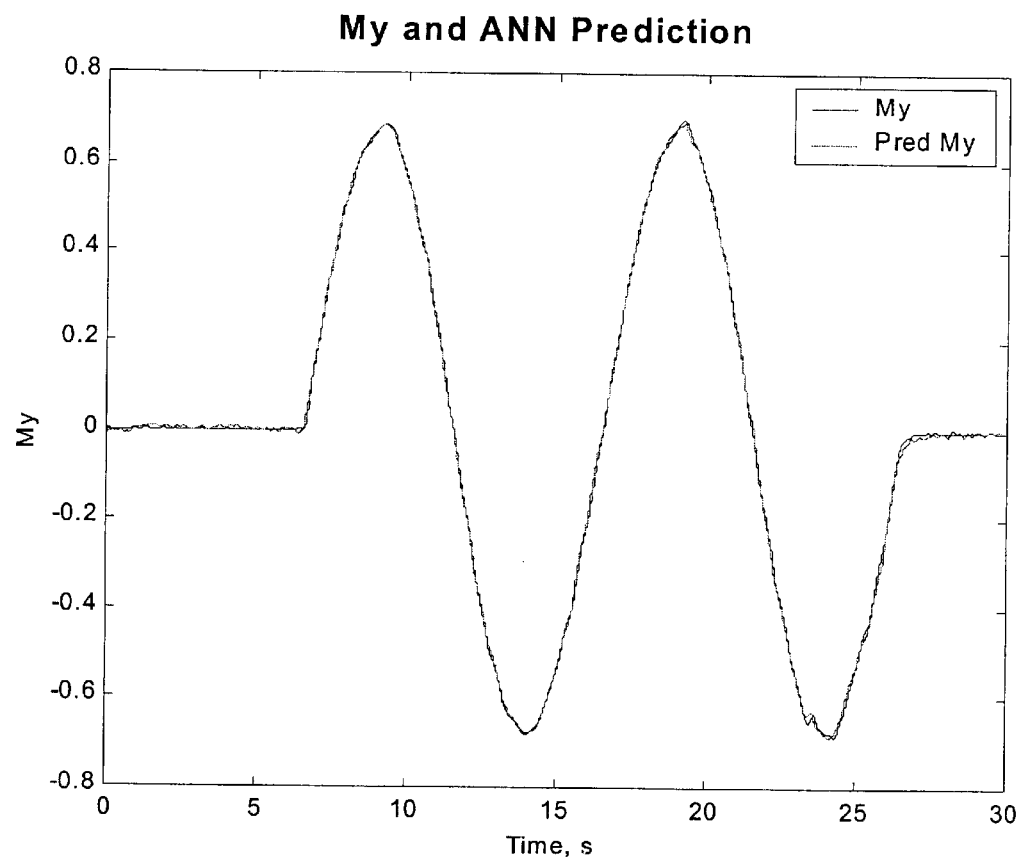
FIG. 20 is a data plot showing measured circumferential torque and the circumferential torque predicted by the trained neural network of Example 3.
Figure 21:
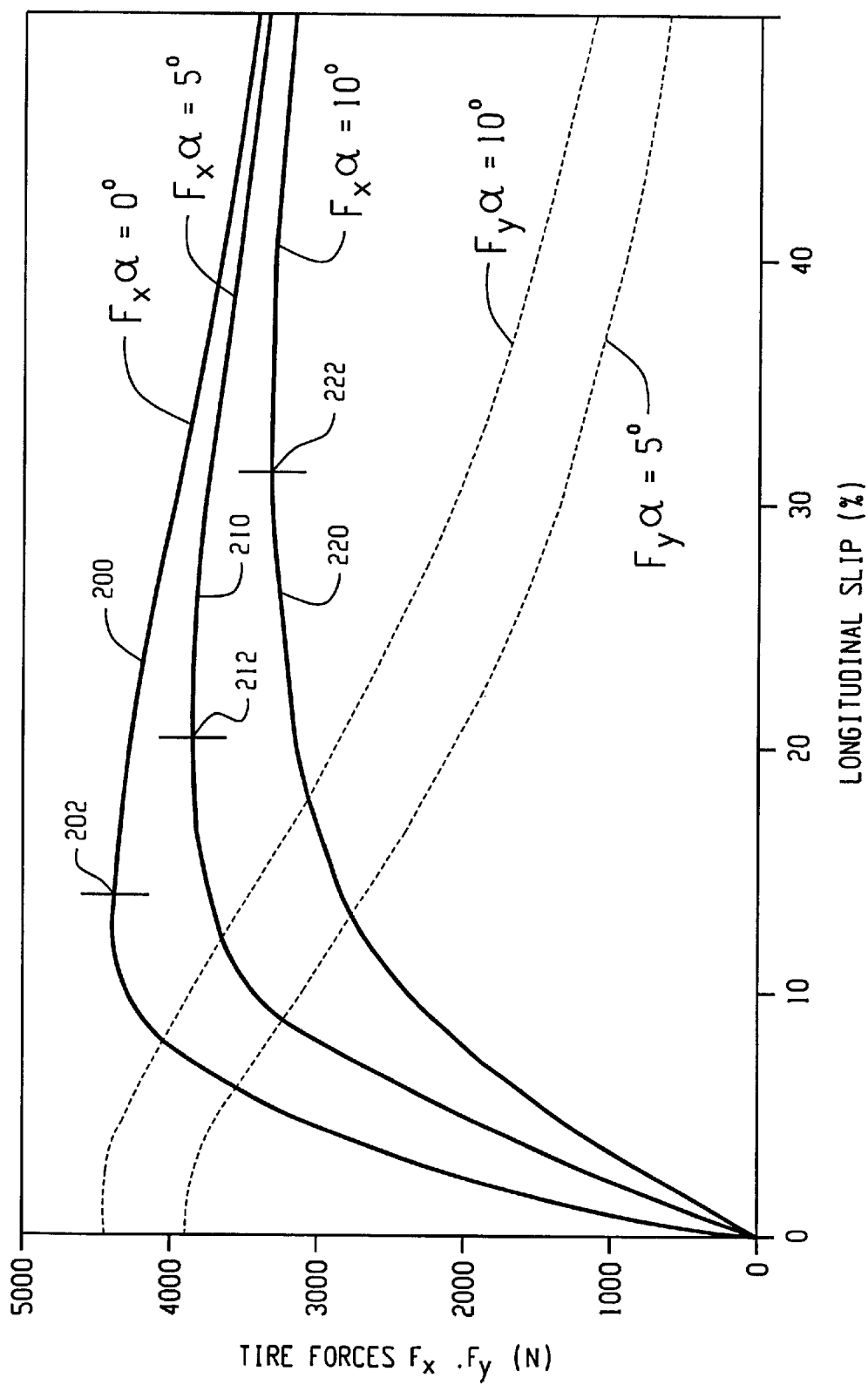
FIG. 21 shows a plurality of coefficient of dynamic friction ($\mu$) versus percent slip ($\mu$-slip) curves at various steering angles showing the significant effect that even small lateral forces can have on the location of the peak of the $\mu$-slip curve.

FIGS. 18–20 show graphical representations of the closeness of the predictions as compared to measured data in the validation set. Using these weights, the vertical force, lateral force, and circumferential torque predicted by the neural network is nearly identical to the measured values in the validation set.

EXAMPLE 4

Bilinear Equations

In this example, the data from Example 2 was used to determine bilinear equations to predict vertical force, lateral force, and circumferential torque.

The constants for the two equations were calculated with Matlab using the multiple linear least squares regression technique.

Using the above procedure, the following bilinear equations were determined to predict vertical force, lateral force, and circumferential torque:

$$F_y = -12.9336 + -11.9139 p180 - 4.4413 a180 + 9.9952 d180 - 5.7197 p90 + 4.1038 a90 - 5.5416 d90 + 0.1871(p180 \times a180) + 0.0676(p90 \times a90)$$

$$F_z = 8.6908 - 79.1627 p180 - 1.1944 a180 + 1.4968 d180 + 10.8531 p90 + 1.2659 a90 + 0.0597 d90 + 3.5677(p180 = a180) + 0.7880(p90 = a90)$$

$$M_y = -0.9059 + 6.5357 p180 - 0.6891 a180 + 1.6094 d180 + 0.0920 p90 + 0.4191 a90 - 0.6654 d90 + 0.3710(p180 = a180) - 0.0027(p90 = a90)$$

Figure 22:
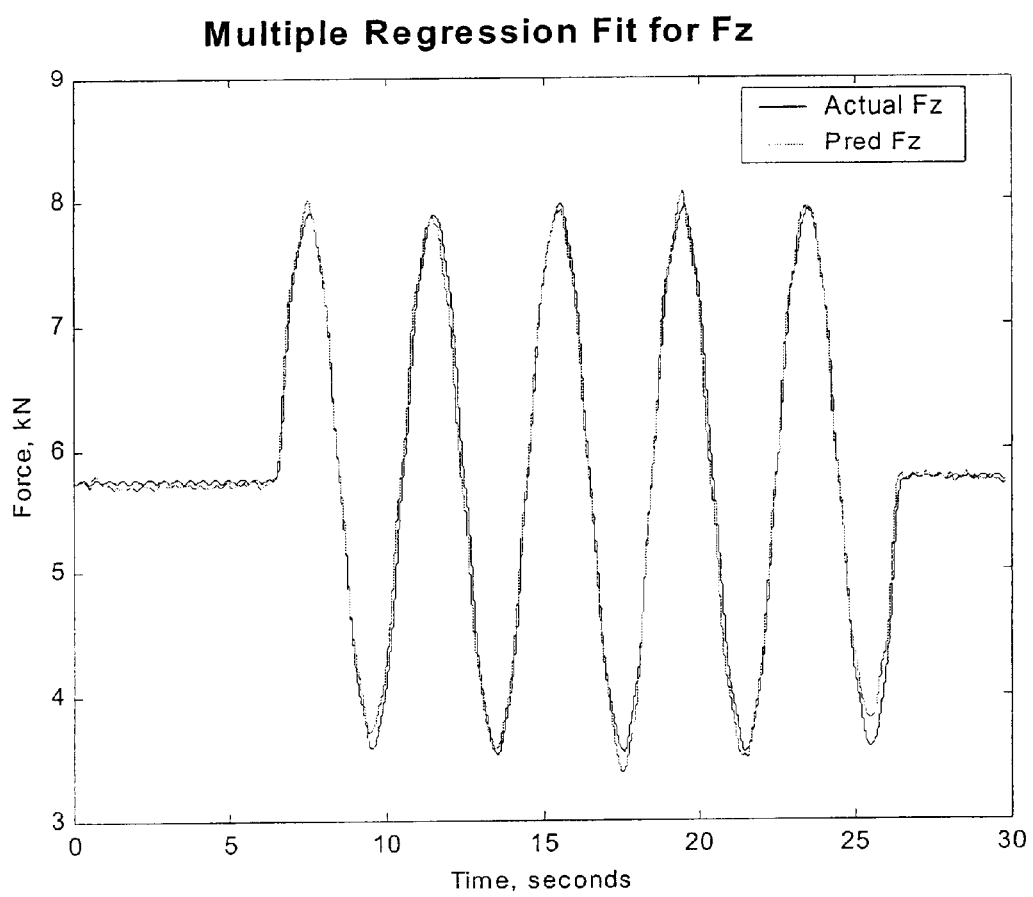
FIG. 22 is a data plot showing measured vertical force and the vertical force predicted by the bilinear equations of Example 4.
Figure 23:
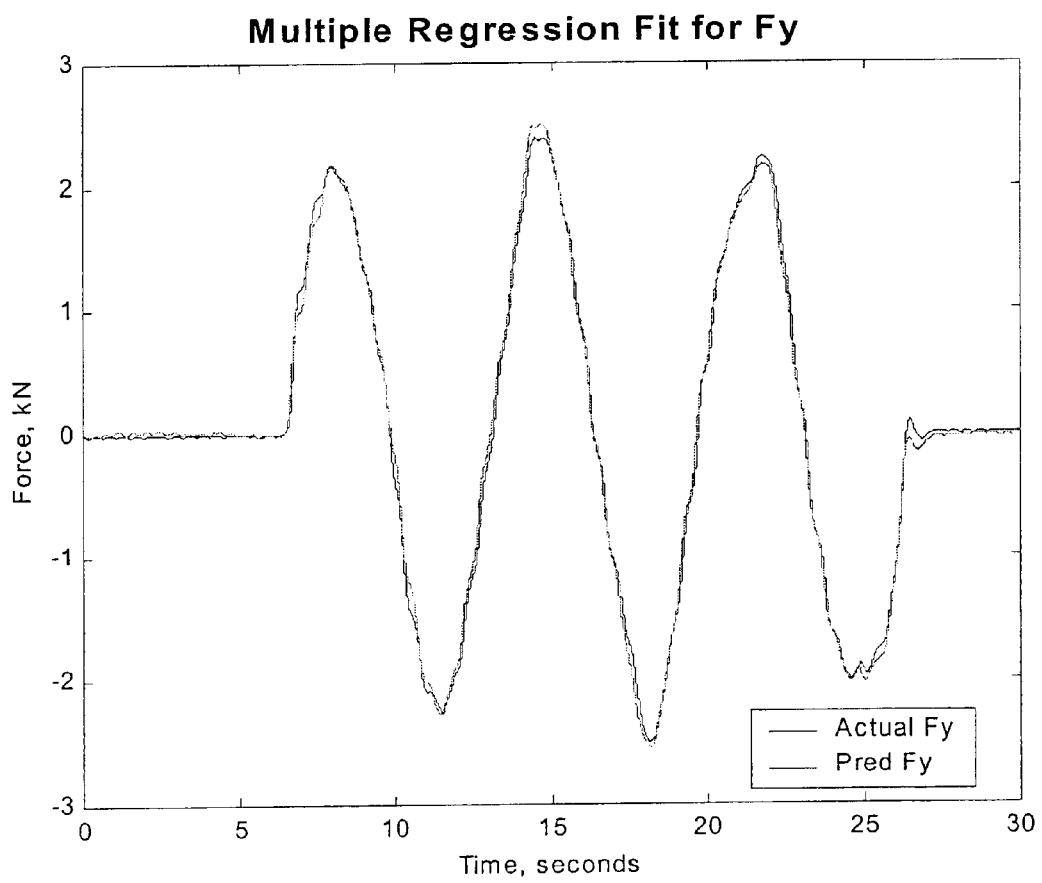
FIG. 23 is a data plot showing measured lateral force and the lateral force predicted by the bilinear equations of Example 4.
Figure 24:
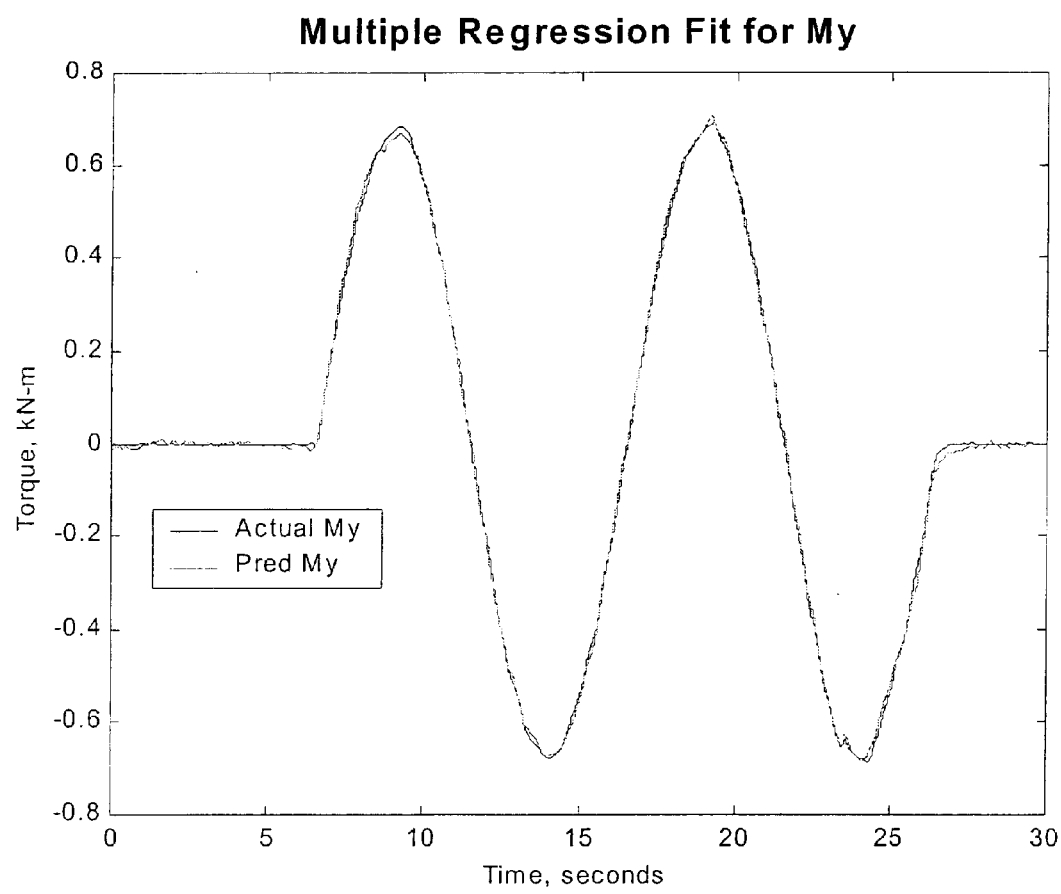
FIG. 24 is a data plot showing measured circumferential torque and the circumferential torque predicted by the bilinear equations of Example 4.

Where, p180=SWT Phase at 180 degree position, radians a180=SWT Amplitude of outer sensor at 180 degree position, mm d180=Difference between SWT outer and inner amplitudes at 180 degrees, mm p90=SWT Phase at 90 degree position, radians a90=SWT Amplitude of outer sensor at 90 degree position, mm d90=Difference between SWT outer and inner amplitudes at 90 degrees, mm $F_y$=Lateral force in kN $F_z$=Vertical (Normal) force in kN $M_y$=Circumferential torque, kN-m FIGS. 22–24 show graphical representations of the closeness of the predictions as compared to measured data in the validation set. Using these bilinear equations, the predicted vertical force, lateral force, and circumferential torque are very close to the measured values. Although the predictions made by the bilinear equations are not as close as the predictions made by the neural network, with the additional sensor pair, the bilinear equations in this example provide very accurate predictions, which can be useful and usable for many applications.

An additional example is attached hereto as Appendix 1 and incorporated herein by reference.

Referring back to FIG. 2, as mentioned above, exemplary control units 32 benefiting from the present invention include but are not limited to ABS control units, traction control system (TCS) control units, electronic stability control (ESC) control units, integrated vehicle dynamics (IVD)) control units, locked differential control units, suspension control units, brake assist control units, intelligent cruise control units, steering assist control units, deflation detection control units, navigation control units, rollover prevention control units, and a brake-by-wire control units.

ABS control units can benefit from the present invention in at least two ways. First, the present invention can be used to reduce ABS chattering. ABS chattering typically results from the nature of slip data. Force data provided by the present invention is smoother than slip data. Accordingly, an ABS controller using force data taken in accordance with the present invention will have less chattering.

Also, ABS control units can be made safer using the lateral force predicted by the present invention. Referring now to FIG. 18, a series of $\mu$-slip curves at various steering angles ($\alpha$) are shown. No steering results in no lateral force. Curve 200 is a typical $\mu$-slip curve showing longitudinal force (i.e., braking force) $F_x$ at a steering angle of 0, i.e., under no lateral force. As shown by that curve 200 and as known to those in the art, the peak of that curve 200 is at a point 202 at about 13% slip. As also known to those in the art, it is desirable for an ABS control unit to strive to control the slip to provide peak braking force at about 10% slip or so.

A steering motion causes a tire to rotate, which induces a lateral force on the tire. Curves 210 and 220 in FIG. 18 are $\mu$-slip curves showing longitudinal force $F_x$ at a steering angle of 5 and 10, respectively. The corresponding lateral forces $F_y$ are also shown. The peak of curve 210 is at a point 212 at about 20% slip and the peak of curve 220 is at a point 222 at about 32% slip. That is, a lateral force on the tire, as caused by a steering maneuver, causes the peak of the $\mu$-slip curve to be moved.

The effect of this should be apparent. An ABS control unit incapable of detecting lateral force would strive to control the slip at about 10% slip or so, which would be effective for maximum braking force as long as there is no steering action. However, a slip at around 10% is not at the peak of the curves 210 and 220. Therefore, a steering maneuver would confound the ABS control unit incapable of detecting lateral force, rendering it incapable of generating a maximum braking force.

On the other hand, an ABS controller 32 modified to accept a predicted lateral force from a force prediction unit 22 of the present invention (or even implemented with the same processor) could vary the slip control point in accordance with the predicted lateral force to provide maximum braking force. For example, the ABS control unit 32 could be modified to select a $\mu$-slip curve or other control parameter based on the predicted lateral force from the force prediction unit 22. In the context of FIG. 18 a first predicted lateral force would be used to trigger curve 210 to be used, and the ABS control unit 32 would tend to control the slip at about point 212 to provide maximum braking. A different, greater predicted lateral force would be used to trigger curve 220 to be used, and the ABS control unit 32 would then tend to control the slip at about point 222 to provide maximum braking. Changing the prediction of lateral force at any instant would change the $\mu$-slip curve used the next instant. Although only three $\mu$-slip curves are described in this example, one of ordinary skill in the art would understand that more curves could be used, or the lateral force (or some other parameter determined by the force prediction unit 22) could be used in an equation or set of equations by the ABS control unit 32 to vary the slip control point in accordance with the predicted lateral force.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the SWT sensors described herein have an analog current output; in the alternative, sensors having outputs in the frequency domain might be used in a system made in accordance with the teachings of the present invention. In addition, the SWT sensors described herein are magnetic sensors; other sidewall torsion sensors might be used in a system made in accordance with the teachings of the present invention. Therefore, the invention in its broader aspects is not limited to the specific details, representative apparatus and method, and illustrative examples shown and described. Accordingly, departures may be made from such details without departing from the spirit or scope of the applicant's general inventive concept.

I claim:

1. A vehicle control system, comprising: a force prediction unit for being placed in circuit communication with a tire deformation sensor and at least one other sensor, the tire deformation sensor being separate from a tire and arranged non-rotatingly with respect to the tire in the vicinity of the tire, said force prediction unit receiving a coupled tire deformation input from the tire deformation sensor, said coupled tire deformation input relating to a circumferential torque applied to the tire and further relating to another force acting on the tire that is skewed with respect to a longitudinal force corresponding to the circumferential torque and said force prediction unit receiving at least one other tire sensor input from the at least one other sensor, said force prediction unit characterized by implementing preprogrammed equations having constants determined from previously collected data to determine from at least the coupled tire deformation input and the at least one other sensor input an output corresponding to a predicted circumferential torque or longitudinal force acting on the tire, said determination of predicted circumferential torque or longitudinal force including said force prediction unit decoupling a first portion of said coupled tire deformation input relating to the circumferential torque applied to the tire from a second portion of said coupled tire deformation input relating to the other, skewed force acting on the tire.

2. The vehicle control system of claim 1, wherein said force prediction unit comprises a preprogrammed processor and further wherein said preprogrammed processor of said force prediction unit executes code implementing a neural network trained with previously collected data to determine from at least the coupled tire deformation input and the at least one other sensor input an output corresponding to a predicted circumferential torque or longitudinal force acting on the tire.

3. The vehicle control system of claim 1, wherein said force prediction unit comprises a preprogrammed processor and further wherein said preprogrammed processor of said force prediction unit executes code implementing a multi-layer neural network trained with previously collected data to determine from at least the coupled tire deformation input and the at least one other sensor input an output corresponding to a predicted circumferential torque or longitudinal force acting on the tire, said multi-layer neural network having an input layer, at least one hidden layer, and an output layer.

4. The vehicle control system of claim 3, wherein said preprogrammed processor implements equations between said input layer and said at least one hidden layer in the form of a hyperbolic tangent sigmoidal transfer function, and wherein said preprogrammed processor implements equations between said hidden layer and said output layer in the form of a linear function.

5. The vehicle control system of claim 1, wherein said force prediction unit comprises a preprogrammed processor and further wherein said preprogrammed processor of said force prediction unit executes code implementing an equation using constants determined using multiple-linear-least squares regression analysis of previously collected data to determine from at least the coupled tire deformation input and the at least one other sensor input an output corresponding to a predicted circumferential torque or longitudinal force acting on the tire.

6. The vehicle control system of claim 5, wherein the equation implemented by the preprogrammed processor of said force prediction unit is a bilinear equation.

7. The vehicle control system of claim 1, wherein said force prediction unit determines from at least the coupled tire deformation input and the at least one other sensor input a phase input related to a phase difference between the at least two sensors and further wherein said force prediction unit determines from at least the coupled tire deformation input an amplitude input related to a distance between the tire sidewall and the tire deformation sensor, and further wherein said force prediction unit comprises a preprogrammed processor, said preprogrammed processor accepting as inputs the phase input and the amplitude input and using at least the phase input and amplitude input to determine at least an output corresponding to a predicted circumferential torque or longitudinal force acting on the tire.

8. The vehicle control system of claim 2, wherein said force prediction unit determines from at least the coupled tire deformation input and the at least one other sensor input a phase input related to a phase difference between the at least two sensors and further wherein said force prediction unit determines from at least the coupled tire deformation input an amplitude input related to a distance between the tire sidewall and the tire deformation sensor, said neural network accepting as inputs the phase input and the amplitude input and using at least the phase input and amplitude input to determine at least an output corresponding to a predicted circumferential torque or longitudinal force acting on the tire.

9. The vehicle control system of claim 6, wherein said force prediction unit determines from at least the coupled tire deformation input and the at least one other sensor input a phase input related to a phase difference between the at least two sensors and further wherein said force prediction unit determines from at least the coupled tire deformation input an amplitude input related to a distance between the tire sidewall and the tire deformation sensor, said bilinear equation being a function of at least the phase input and the amplitude input to determine an output corresponding to a predicted circumferential torque or longitudinal force acting on the tire.

10. The vehicle control system of any of claims 1–9, wherein the tire deformation sensor comprises a magnetic tire sidewall torsion (SWT) sensor, said SWT sensor including a magnetic sensor positioned proximate to a sidewall of the tire that has been magnetized with alternating magnetic poles.

11. A vehicle control system, comprising: a force prediction unit for being placed in circuit communication with a tire deformation sensor and at least one other sensor, the tire deformation sensor being separate from a tire and arranged non-rotatingly with respect to the tire in the vicinity of the tire, said force prediction unit receiving a coupled tire deformation input from the tire deformation sensor, said coupled tire deformation input relating to a circumferential torque applied to the tire and further relating to a lateral force acting on the tire and said force prediction unit receiving at least one other tire sensor input from the at least one other sensor, said force prediction unit characterized by implementing preprogrammed equations having constants determined from previously collected data to determine from at least the coupled tire deformation input and the at least one other sensor input an output corresponding to a predicted lateral force acting on the tire, said determination of predicted lateral force including said force prediction unit decoupling a first portion of said coupled tire deformation input relating to the lateral force acting on the tire from a second portion of said coupled tire deformation input relating to the circumferential torque applied to the tire.

12. The vehicle control system of claim 11, wherein said force prediction unit comprises a preprogrammed processor and further wherein said preprogrammed processor of said force prediction unit executes code implementing a neural network trained with previously collected data to determine from at least the coupled tire deformation input and the at least one other sensor input an output corresponding to a predicted lateral force acting on the tire.

13. The vehicle control system of claim 11, wherein said force prediction unit comprises a preprogrammed processor and further wherein said preprogrammed processor of said force prediction unit executes code implementing a multi-layer neural network trained with previously collected data to determine from at least the coupled tire deformation input and the at least one other sensor input an output corresponding to a predicted lateral force acting on the tire, said multi-layer neural network having an input layer, at least one hidden layer, and an output layer.

14. The vehicle control system of claim 13, wherein said preprogrammed processor implements equations between said input layer and said at least one hidden layer in the form of a hyperbolic tangent sigmoidal transfer function, and wherein said preprogrammed processor implements equations between said hidden layer and said output layer in the form of a linear function.

15. The vehicle control system of claim 11, wherein said force prediction unit comprises a preprogrammed processor and further wherein said preprogrammed processor of said force prediction unit executes code implementing an equation using constants determined using multiple-linear-least squares regression analysis of previously collected data to determine from at least the coupled tire deformation input and the at least one other sensor input an output corresponding to a predicted lateral force acting on the tire.

16. The vehicle control system of claim 15, wherein the equation implemented by the preprogrammed processor of said force prediction unit is a bilinear equation.

17. The vehicle control system of claim 11, wherein said force prediction unit determines from at least the coupled tire deformation input and the at least one other sensor input a phase input related to a phase difference between the at least two sensors and further wherein said force prediction unit determines from at least the coupled tire deformation input an amplitude input related to a distance between the tire sidewall and the tire deformation sensor, and further wherein said force prediction unit comprises a preprogrammed processor, said preprogrammed processor accepting as inputs the phase input and the amplitude input and using at least the phase input and amplitude input to determine at least an output corresponding to a predicted lateral force acting on the tire.

18. The vehicle control system of claim 12, wherein said force prediction unit determines from at least the coupled tire deformation input and the at least one other sensor input a phase input related to a phase difference between the at least two sensors and further wherein said force prediction unit determines from at least the coupled tire deformation input an amplitude input related to a distance between the tire sidewall and the tire deformation sensor, said neural network accepting as inputs the phase input and the amplitude input and using at least the phase input and amplitude input to determine at least an output corresponding to a predicted lateral force acting on the tire.

19. The vehicle control system of claim 16, wherein said force prediction unit determines from at least the coupled tire deformation input and the at least one other sensor input a phase input related to a phase difference between the at least two sensors and further wherein said force prediction unit determines from at least the coupled tire deformation input an amplitude input related to a distance between the tire sidewall and the tire deformation sensor, said bilinear equation being a function of at least the phase input and the amplitude input to determine an output corresponding to a predicted lateral force acting on the tire.

20. The vehicle control system of any of claims 11–19, wherein the tire deformation sensor comprises a magnetic tire sidewall torsion (SWT) sensor, said SWT sensor including a magnetic sensor positioned proximate to a sidewall of the tire that has been magnetized with alternating magnetic poles.

21. A vehicle control system, comprising: a force prediction unit for being placed in circuit communication with a tire deformation sensor and at least one other sensor, the tire deformation sensor being separate from a tire and arranged non-rotatingly with respect to the tire in the vicinity of the tire, said force prediction unit receiving a coupled tire deformation input from the tire deformation sensor, said coupled tire deformation input relating to a circumferential torque applied to the tire and further relating to a vertical force acting on the tire and said force prediction unit receiving at least one other tire sensor input from the at least one other sensor, said force prediction unit comprising a preprogrammed processor receiving the coupled tire deformation input and the at least one other sensor input, said force prediction unit characterized by implementing preprogrammed equations having constants determined from previously collected data to determine from at least the coupled tire deformation input and the at least one other sensor input an output corresponding to a predicted vertical force acting on the tire, said determination of predicted vertical force including said force prediction unit decoupling a first portion of said coupled tire deformation input relating to the vertical force acting on the tire from a second portion of said coupled tire deformation input relating to the circumferential torque applied to the tire.

22. The vehicle control system of claim 21, wherein said force prediction unit comprises a preprogrammed processor and further wherein said preprogrammed processor of said force prediction unit executes code implementing a neural network trained with previously collected data to determine from at least the coupled tire deformation input and the at least one other sensor input an output corresponding to a predicted vertical force acting on the tire.

23. The vehicle control system of claim 21, wherein said force prediction unit comprises a preprogrammed processor and further wherein said preprogrammed processor of said force prediction unit executes code implementing a multi-layer neural network trained with previously collected data to determine from at least the coupled tire deformation input and the at least one other sensor input an output corresponding to a predicted vertical force acting on the tire, said multi-layer neural network having an input layer, at least one hidden layer, and an output layer.

24. The vehicle control system of claim 23, wherein said preprogrammed processor implements equations between said input layer and said at least one hidden layer in the form of a hyperbolic tangent sigmoidal transfer function, and wherein said preprogrammed processor implements equations between said hidden layer and said output layer in the form of a linear function.

25. The vehicle control system of claim 21, wherein said force prediction unit comprises a preprogrammed processor and further wherein said preprogrammed processor of said force prediction unit executes code implementing an equation using constants determined using multiple-linear-least squares regression analysis of previously collected data to determine from at least the coupled tire deformation input and the at least one other sensor input an output corresponding to a predicted vertical force acting on the tire.

26. The vehicle control system of claim 25, wherein the equation implemented by the preprogrammed processor of said force prediction unit is a bilinear equation.

27. The vehicle control system of claim 21, wherein said force prediction unit determines from at least the coupled tire deformation input and the at least one other sensor input a phase input related to a phase difference between the at least two sensors and further wherein said force prediction unit determines from at least the coupled tire deformation input an amplitude input related to a distance between the tire sidewall and the tire deformation sensor, and further wherein said force prediction unit comprises a preprogrammed processor, said preprogrammed processor accepting as inputs the phase input and the amplitude input and using at least the phase input and amplitude input to determine at least an output corresponding to a predicted vertical force acting on the tire.

28. The vehicle control system of claim 22, wherein said force prediction unit determines from at least the coupled tire deformation input and the at least one other sensor input a phase input related to a phase difference between the at least two sensors and further wherein said force prediction unit determines from at least the coupled tire deformation input an amplitude input related to a distance between the tire sidewall and the tire deformation sensor, said neural network accepting as inputs the phase input and the amplitude input and using at least the phase input and amplitude input to determine at least an output corresponding to a predicted vertical force acting on the tire.

29. The vehicle control system of claim 26, wherein said force prediction unit determines from at least the coupled tire deformation input and the at least one other sensor input a phase input related to a phase difference between the at least two sensors and further wherein said force prediction unit determines from at least the coupled tire deformation input an amplitude input related to a distance between the tire sidewall and the tire deformation sensor, said bilinear equation being a function of at least the phase input and the amplitude input to determine an output corresponding to a predicted vertical force acting on the tire.

30. The vehicle control system of any of claims 21–29, wherein the tire deformation sensor comprises a magnetic tire sidewall torsion (SWT) sensor, said SWT sensor including a magnetic sensor positioned proximate to a sidewall of the tire that has been magnetized with alternating magnetic poles.

31. The vehicle control system of claim 1, wherein said force prediction unit is further characterized by implementing preprogrammed equations having constants determined from previously collected data to determine from at least the coupled tire deformation input and the at least one other sensor input (a) an output corresponding to a predicted circumferential torque or longitudinal force acting on the tire and (b) an output corresponding to a prediction of the force acting on the tire that is skewed with respect to the longitudinal force acting on the tire.

32. The vehicle control system of claim 31, wherein said force prediction unit is further characterized by implementing preprogrammed equations having constants determined from previously collected data to determine from at least the coupled tire deformation input and the at least one other sensor input (a) an output corresponding to a predicted circumferential torque or longitudinal force acting on the tire and (b) an output corresponding to a predicted lateral force acting on the tire.

33. The vehicle control system of claim 31, wherein said force prediction unit is further characterized by implementing preprogrammed equations having constants determined from previously collected data to determine from at least the coupled tire deformation input and the at least one other sensor input (a) an output corresponding to a predicted circumferential torque or longitudinal force acting on the tire and (b) an output corresponding to a predicted vertical force acting on the tire.

34. The vehicle control system of claim 10, wherein said force prediction unit is further characterized by implementing preprogrammed equations having constants determined from previously collected data to determine from at least the coupled tire deformation input and the at least one other sensor input (a) an output corresponding to a predicted lateral force acting on the tire and (b) an output corresponding to a prediction of the force acting on the tire that is skewed with respect to the lateral force acting on the tire.

35. The vehicle control system of claim 34, wherein said force prediction unit is further characterized by implementing preprogrammed equations having constants determined from previously collected data to determine from at least the coupled tire deformation input and the at least one other sensor input (a) an output corresponding to a predicted lateral force acting on the tire and (b) an output corresponding to a predicted vertical force acting on the tire.

36. The vehicle control system of claim 20, wherein said force prediction unit is further characterized by implementing preprogrammed equations having constants determined from previously collected data to determine from at least the coupled tire deformation input and the at least one other sensor input (a) an output corresponding to a predicted vertical force acting on the tire and (b) an output corresponding to a prediction of the force acting on the tire that is skewed with respect to the vertical force acting on the tire.

37. A vehicle control system comprising:
(a) a force prediction unit for being placed in circuit communication with a tire deformation sensor and at least one other sensor, the tire deformation sensor being separate from a tire and arranged non-rotatingly with respect to the tire in the vicinity of the tire, said force prediction unit receiving a coupled tire deformation input from the tire deformation sensor, said coupled tire deformation input relating to a circumferential torque applied to the tire and further relating to another force acting on the tire that is skewed with respect to a longitudinal force corresponding to the circumferential torque and said force prediction unit receiving at least one other tire sensor input from the at least one other sensor, said force prediction unit comprising a preprogrammed processor receiving the coupled tire deformation input and the at least one other sensor input, said force prediction unit characterized by implementing preprogrammed equations having constants determined from previously collected data to determine from at least the coupled tire deformation input and the at least one other sensor input an output corresponding to a predicted circumferential torque or longitudinal force acting on a tire and outputting a predicted circumferential torque or longitudinal force output corresponding to the predicted circumferential torque or longitudinal force acting on the tire, said determination of predicted circumferential torque or longitudinal force including said force prediction unit decoupling a first portion of said coupled tire deformation input relating to the circumferential torque applied to the tire from a second portion of said coupled tire deformation input relating to the other, skewed force acting on the tire; and
(b) a control unit in circuit communication with said force prediction unit for receiving the predicted circumferential torque or longitudinal force output and for being placed in circuit communication with vehicle actuators, said control unit characterized by altering the dynamic state of the vehicle via the actuators responsive at least in part to the predicted circumferential torque or longitudinal force output from the force prediction unit.

38. A vehicle control system comprising:
(a) a force prediction unit for being placed in circuit communication with a tire deformation sensor and at least one other sensor, the tire deformation sensor being separate from a tire and arranged non-rotatingly with respect to the tire in the vicinity of the tire, said force prediction unit receiving a coupled tire deformation input from the tire deformation sensor, said coupled tire deformation input relating to a circumferential torque applied to the tire and further relating to a lateral force acting on the tire and said force prediction unit receiving at least one other tire sensor input from the at least one other sensor, said force prediction unit comprising a preprogrammed processor receiving the coupled tire deformation input and the at least one other sensor input, said force prediction unit characterized by implementing preprogrammed equations having constants determined from previously collected data to determine from at least the coupled tire deformation input and the at least one other sensor input an output corresponding to a predicted lateral force acting on the tire and outputting a predicted lateral force output corresponding to the predicted lateral force acting on the tire, said determination of predicted lateral force including said force prediction unit decoupling a first portion of said coupled tire deformation input relating to the lateral force acting on the tire from a second portion of said coupled tire deformation input relating to the circumferential torque applied to the tire; and
(b) a control unit in circuit communication with said force prediction unit for receiving the predicted lateral force output and for being placed in circuit communication with vehicle actuators, said control unit characterized by altering the dynamic state of the vehicle via the actuators responsive at least in part to the predicted lateral force output from the force prediction unit.

39. The vehicle control system of claim 38, wherein said control unit has associated therewith a plurality of $\mu$-slip curves, each of said $\mu$-slip curves being associated with a different lateral force, said control unit implementing an anti-lock braking system based on a selected one of said $\mu$-slip curves, and further wherein said control unit is characterized by selecting the of said plurality of $\mu$-slip curves responsive at least in part to the predicted lateral force output from the force prediction unit and using the selected one of said plurality of $\mu$-slip curves to implement anti-lock braking.

40. A vehicle control system comprising:
(a) a force prediction unit for being placed in circuit communication with a tire deformation sensor and at least one other sensor, the tire deformation sensor being separate from a tire and arranged non-rotatingly with respect to the tire in the vicinity of the tire, said force prediction unit receiving a coupled tire deformation input from the tire deformation sensor, said coupled tire deformation input relating to a circumferential torque applied to the tire and further relating to a vertical force acting on the tire and said force prediction unit receiving at least one other tire sensor input from the at least one other sensor, said force prediction unit comprising a preprogrammed processor receiving the coupled tire deformation input and the at least one other sensor input, said force prediction unit characterized by implementing preprogrammed equations having constants determined from previously collected data to determine from at least the coupled tire deformation input and the at least one other sensor input an output corresponding to a predicted vertical force acting on a tire and outputting a predicted vertical force output corresponding to the predicted vertical force acting on the tire, said determination of predicted vertical force including said force prediction unit decoupling a first portion of said coupled tire deformation input relating to the vertical force acting on the tire from a second portion of said coupled tire deformation input relating to the circumferential torque applied to the tire; and
(b) a control unit in circuit communication with said force prediction unit for receiving the predicted vertical force output and for being placed in circuit communication with vehicle actuators, said control unit characterized by altering the dynamic state of the vehicle via the actuators responsive at least in part to the predicted vertical force output from the force prediction unit.

41. A method of predicting the circumferential torque or longitudinal force acting on a tire, comprising the steps of:
(a) providing a force prediction unit for being placed in circuit communication with a tire deformation sensor and at least one other sensor, the tire deformation sensor being separate from the tire and arranged non-rotatingly with respect to the tire in the vicinity of the tire, said force prediction unit receiving a coupled tire deformation input from the tire deformation sensor, said coupled tire deformation input relating to a circumferential torque applied to the tire and further relating to another force acting on the tire that is skewed with respect to a longitudinal force corresponding to the circumferential torque and said force prediction unit receiving at least one other tire sensor input from the at least one other sensor, said force prediction unit comprising a preprogrammed processor receiving the coupled tire deformation input and the at least one other sensor input, said force prediction unit characterized by implementing preprogrammed equations having constants determined from previously collected data to determine from at least the coupled tire deformation input and the at least one other sensor input an output corresponding to a predicted vertical force acting on a tire;
(b) collecting tire deformation input from the tire deformation sensor and the at least one other tire sensor input from the at least one other sensor; and
(c) determining with the force prediction unit the circumferential torque or longitudinal force acting on a tire from the collected tire deformation input and the collected at least one other tire sensor input, said determination of predicted circumferential torque or longitudinal force including said force prediction unit decoupling a first portion of said coupled tire deformation input relating to the circumferential torque applied to the tire from a second portion of said coupled tire deformation input relating to the other, skewed force acting on the tire.

42. A method of training a neural network to determine the circumferential torque or longitudinal force acting on a tire from a tire deformation sensor and at least one other sensor, comprising the steps of:
(a) collecting tire deformation input from a tire deformation sensor and at least one other tire sensor input from at least one other sensor, the tire deformation sensor being separate from the tire and arranged non-rotatingly with respect to the tire in the vicinity of the tire;

(b) collecting an input corresponding to the circumferential torque or longitudinal force acting on the tire;

(c) training the neural network to predict the circumferential torque or longitudinal force acting on a tire using as training data at least the collected tire deformation input relating to the length of the changing air gap between the tire deformation sensor and the tire, the collected at least one other tire sensor input, and the collected input corresponding to the circumferential torque or longitudinal force acting on the tire.

43. The vehicle control system of any of claims 1–9, wherein the tire deformation sensor comprises a magnetic tire sidewall torsion (SWT) sensor, said SWT sensor including a magnetic sensor positioned proximate to a sidewall of the tire that has been magnetized with alternating magnetic poles, and further wherein the at least one other tire sensor is an ABS speed sensor.

44. The vehicle control system of any of claims 11–19, wherein the tire deformation sensor comprises a magnetic tire sidewall torsion (SWT) sensor, said SWT sensor including a magnetic sensor positioned proximate to a sidewall of the tire that has been magnetized with alternating magnetic poles, and further wherein the at least one other tire sensor is an ABS speed sensor.

45. The vehicle control system of any of claims 21–29, wherein the tire deformation sensor comprises a magnetic tire sidewall torsion (SWT) sensor, said SWT sensor including a magnetic sensor positioned proximate to a sidewall of the tire that has been magnetized with alternating magnetic poles, and further wherein the at least one other tire sensor is an ABS speed sensor.

* * * * *

UNITED STATES PATENT AND TRADEMARK OFFICE
CERTIFICATE OF CORRECTION

| | | |
|---|---|---|
| PATENT NO. | : 6,550,320 B1 | Page 1 of 1 |
| DATED | : April 22, 2003 | |
| INVENTOR(S) | : James M. Giustino | |

It is certified that error appears in the above-identified patent and that said Letters Patent is hereby corrected as shown below:

Column 21,
Lines 37-38, please delete "An additional example is attached hereto as Appendix 1 and incorporated herein by reference."

Signed and Sealed this

Twenty-third Day of September, 2003

JAMES E. ROGAN
*Director of the United States Patent and Trademark Office*